No. 863,065.
PATENTED AUG. 13, 1907.
F. W. HILLARD.
TYPE WRITING MACHINE.
APPLICATION FILED DEC. 23, 1901.
12 SHEETS—SHEET 9.
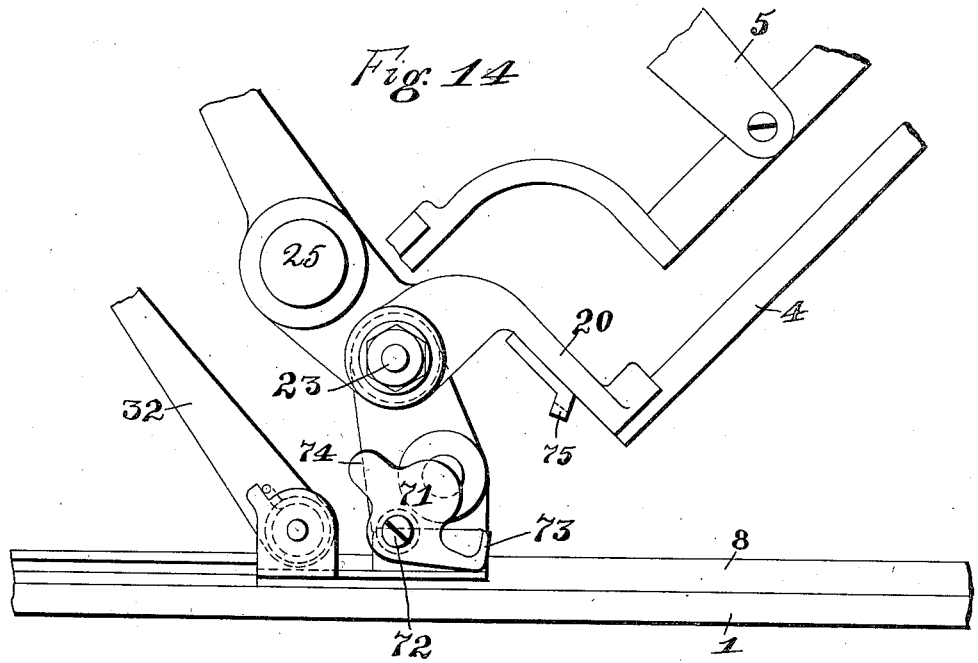
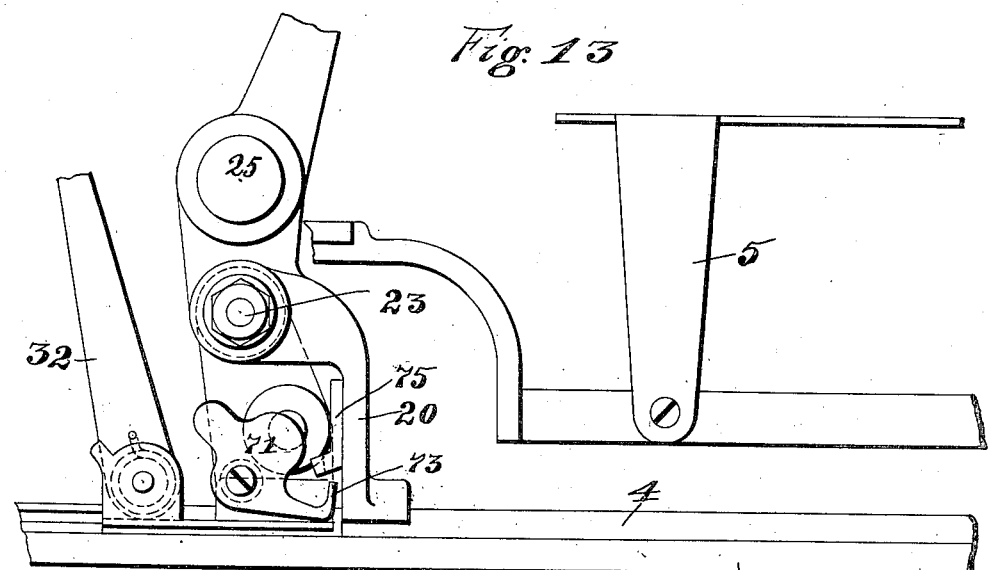
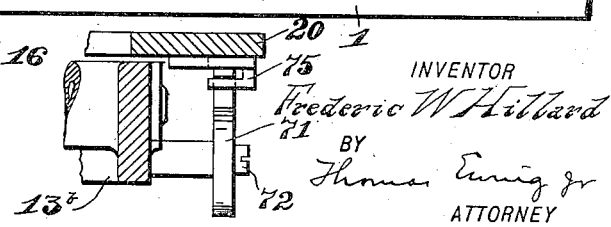
WITNESSES:
Edward G. Neuhaus.
Geo. L. Wheelock.
INVENTOR
Frederic W. Hillard
BY
Thomas Ewing Jr
ATTORNEY

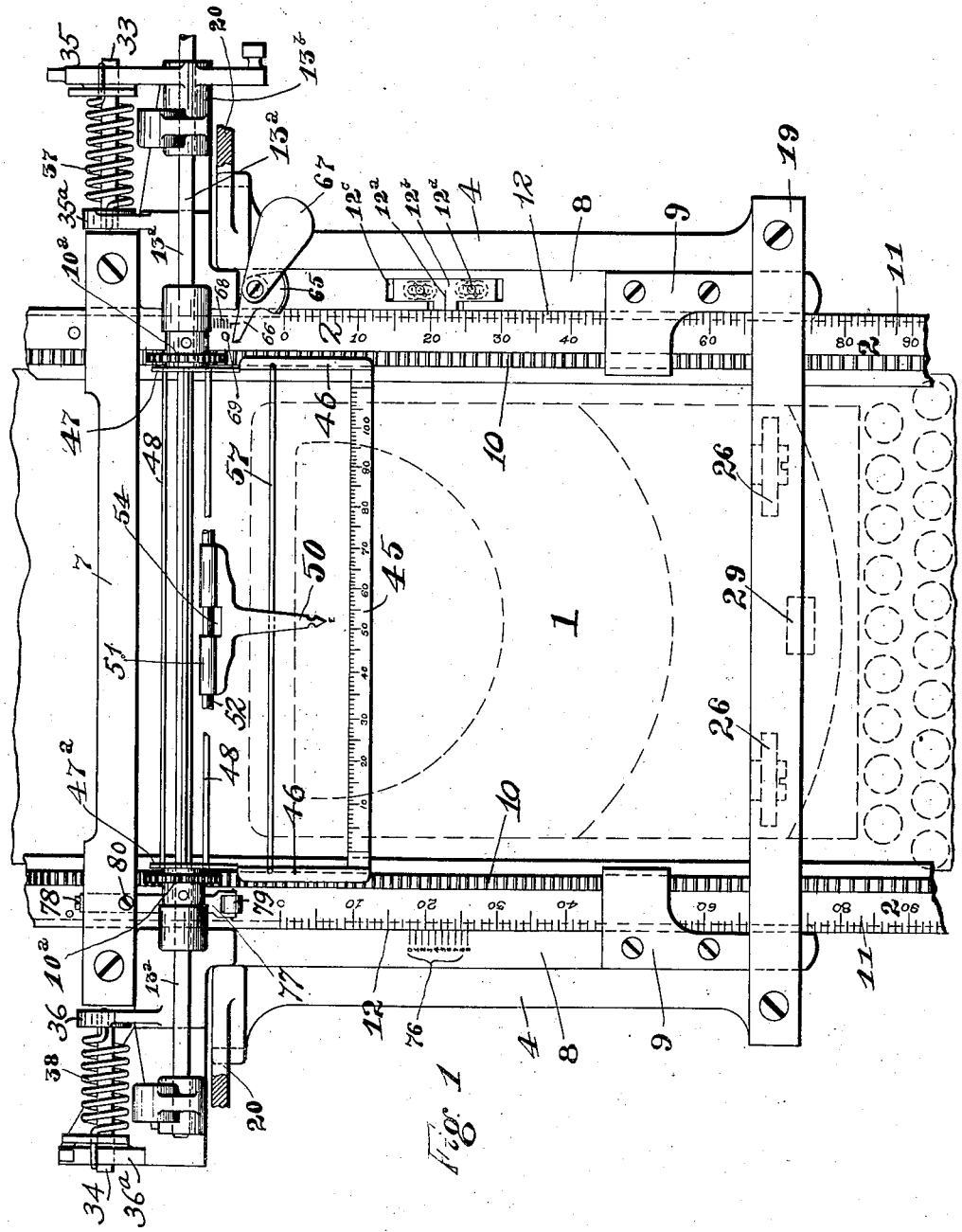

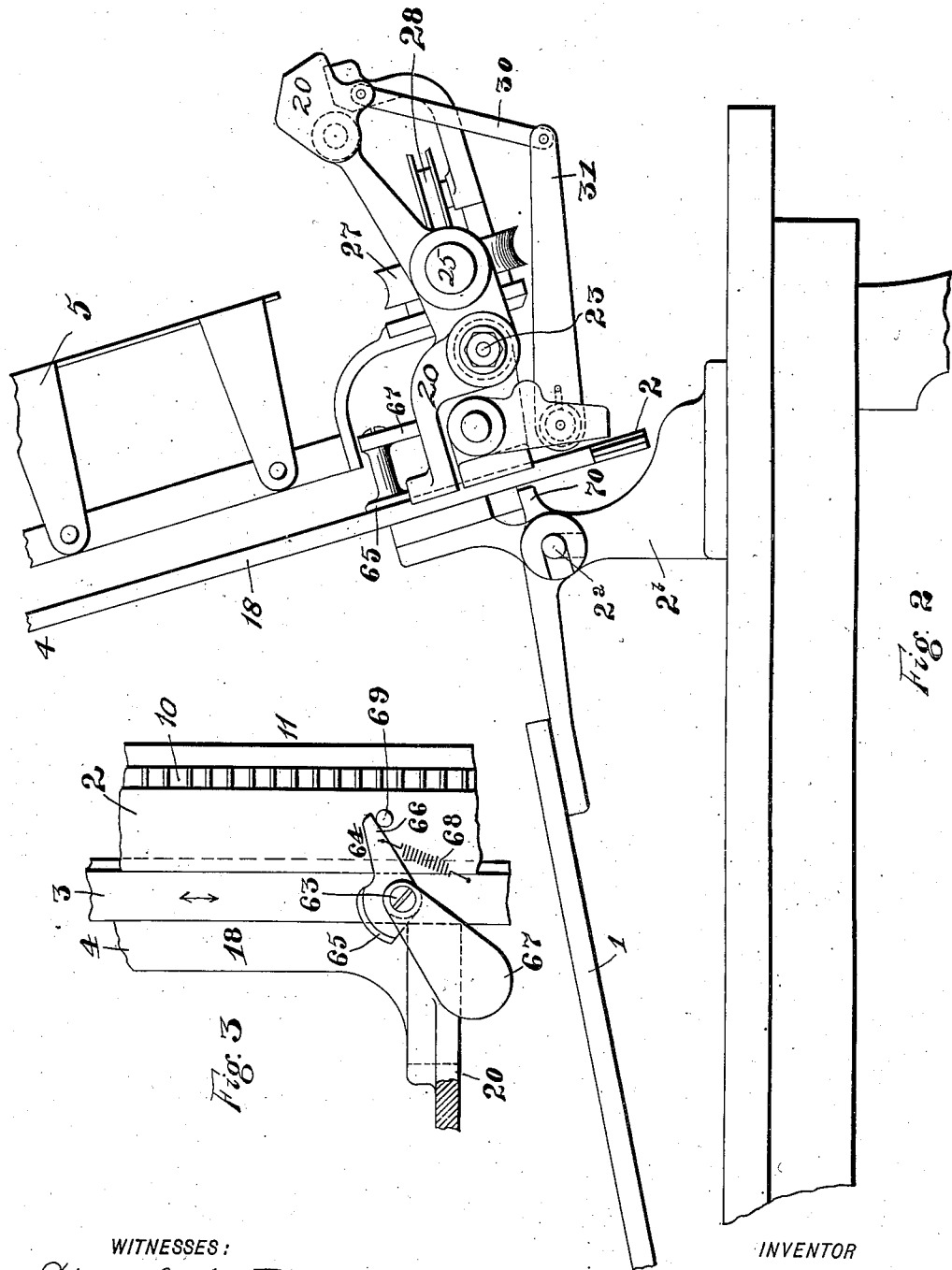

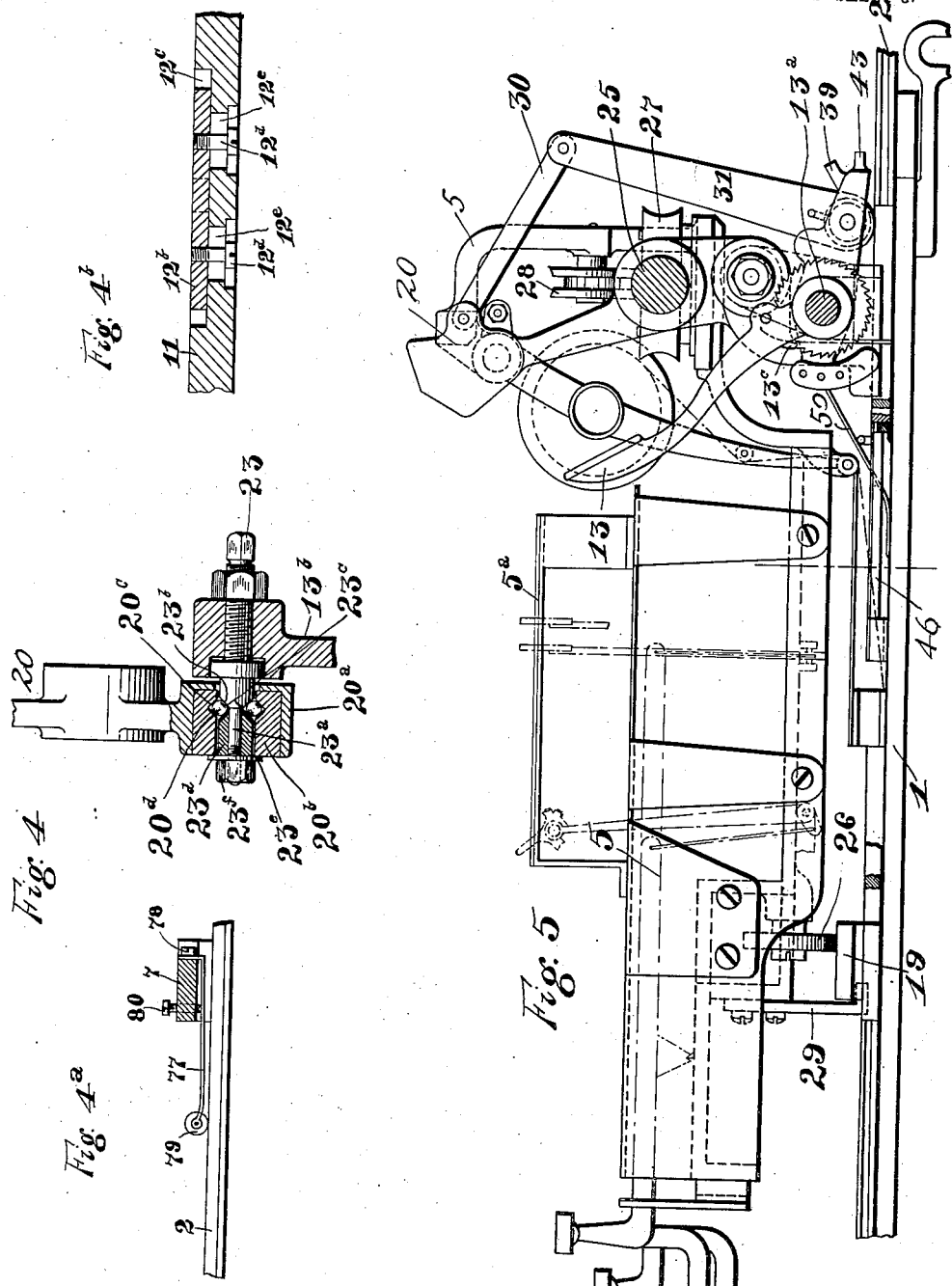

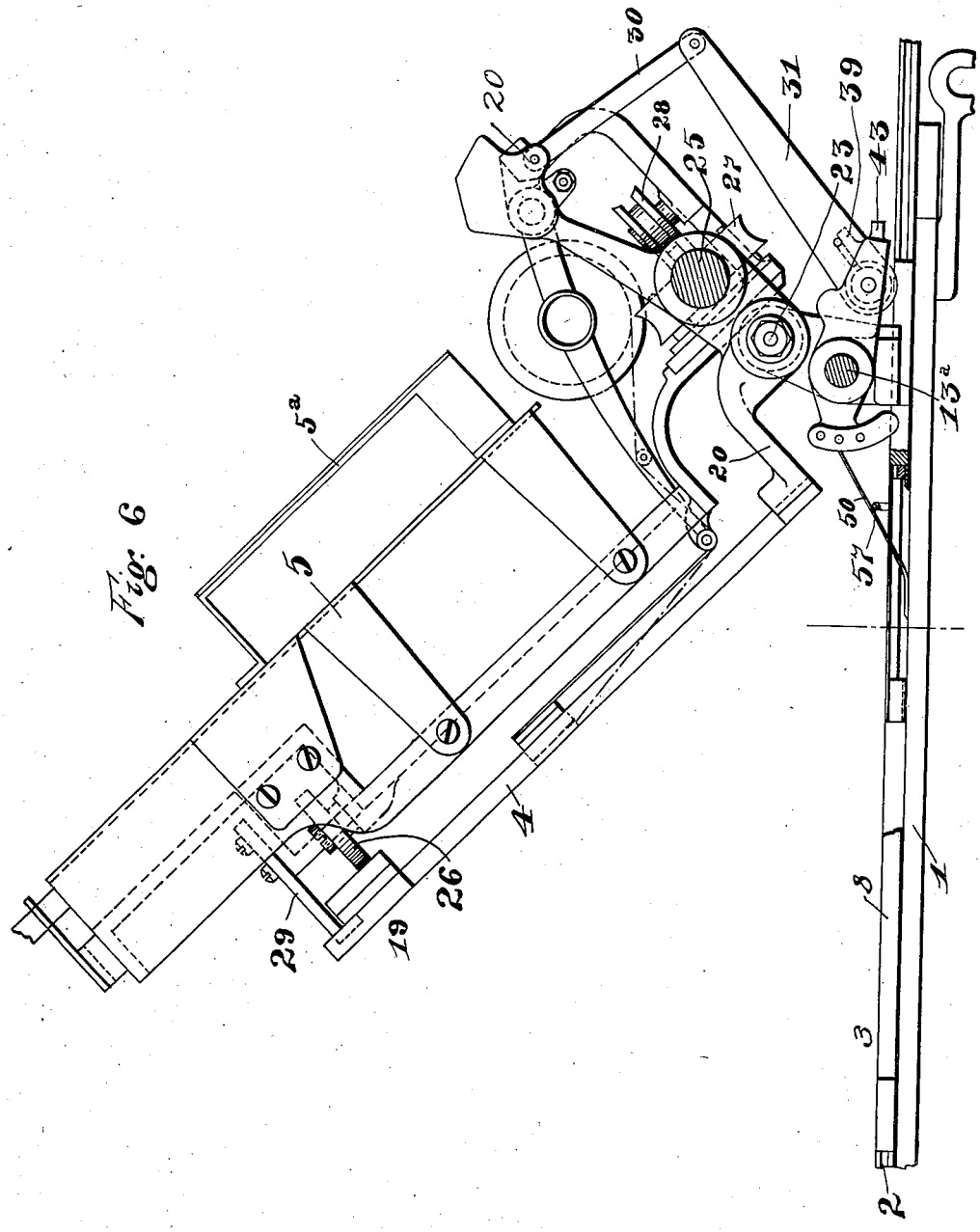

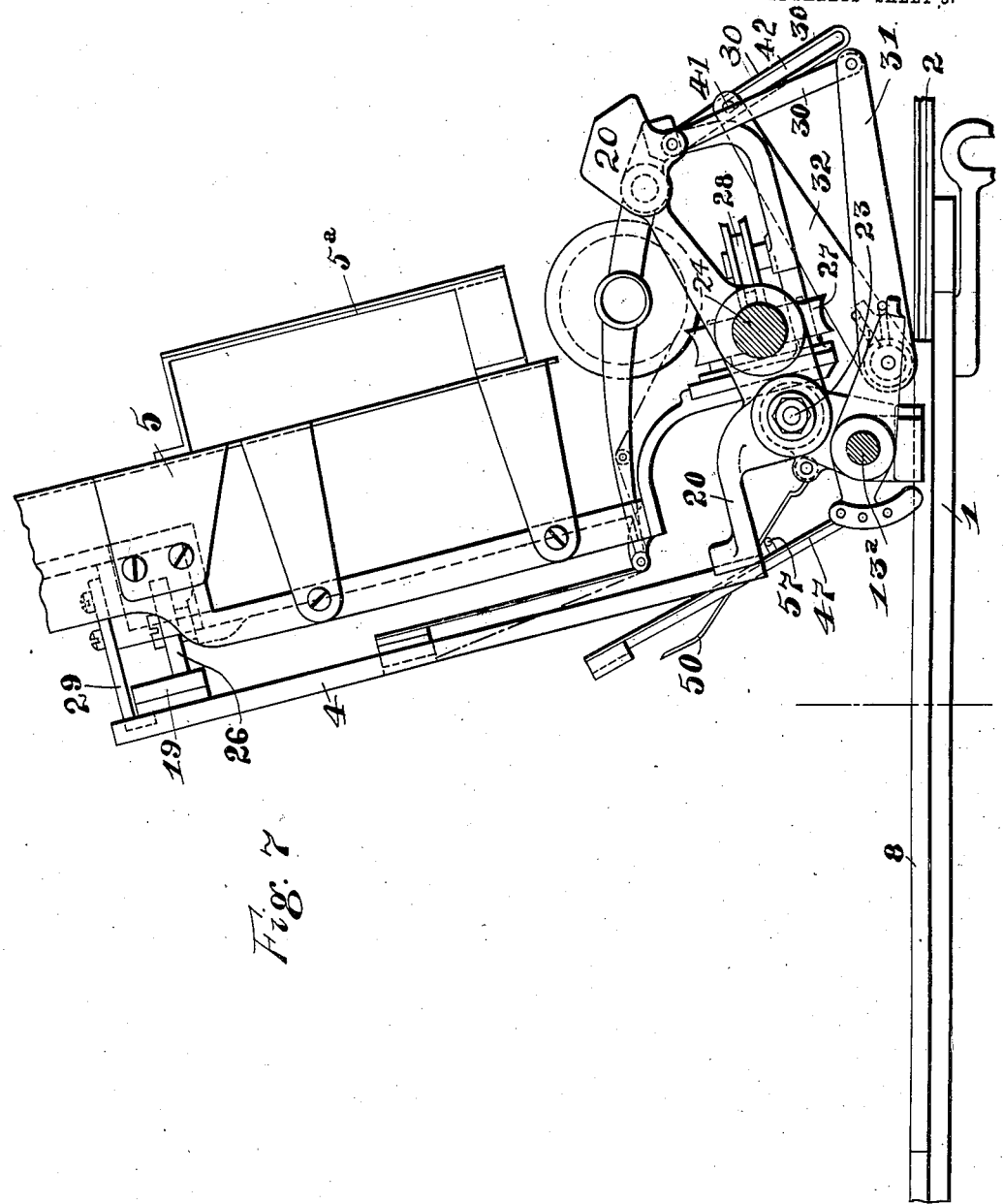

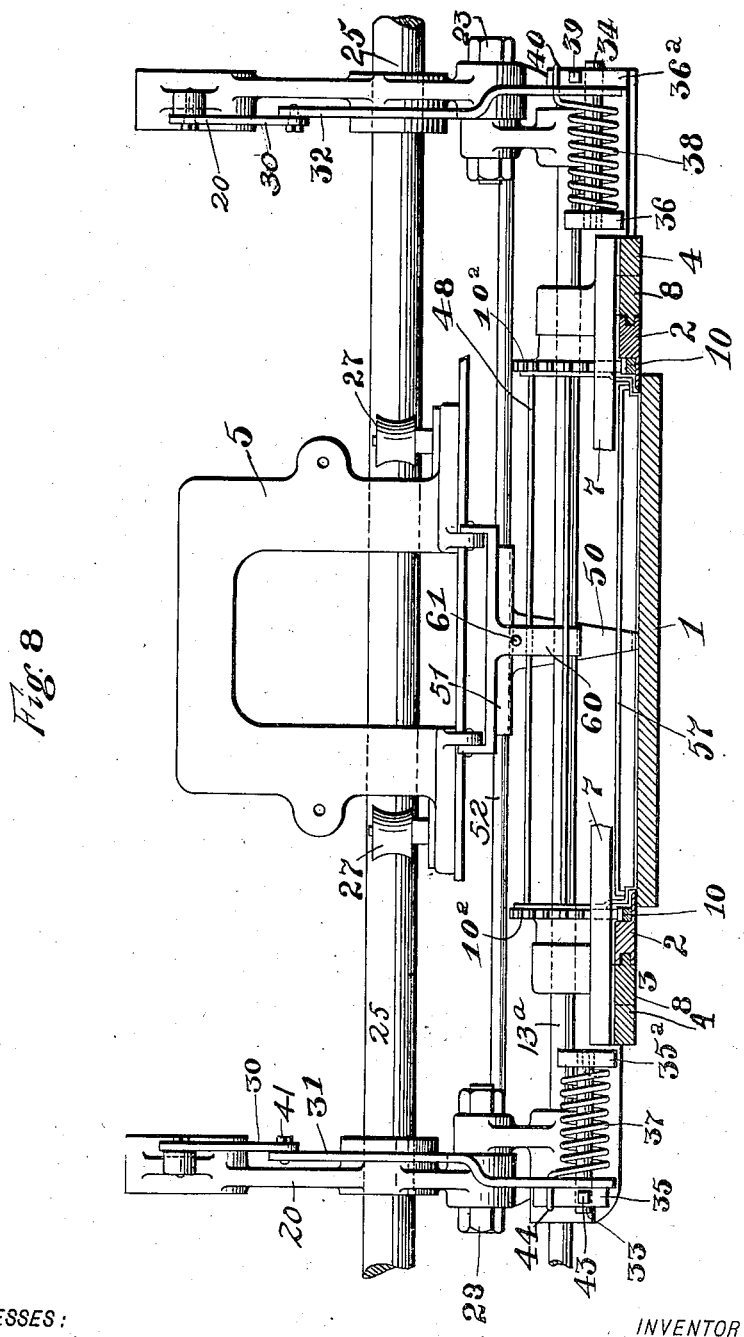

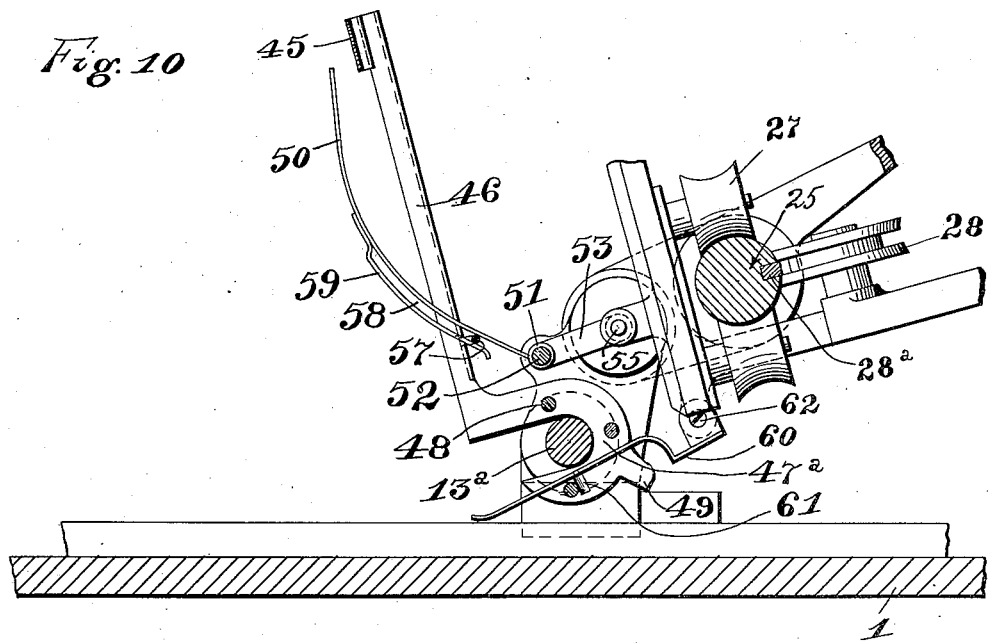
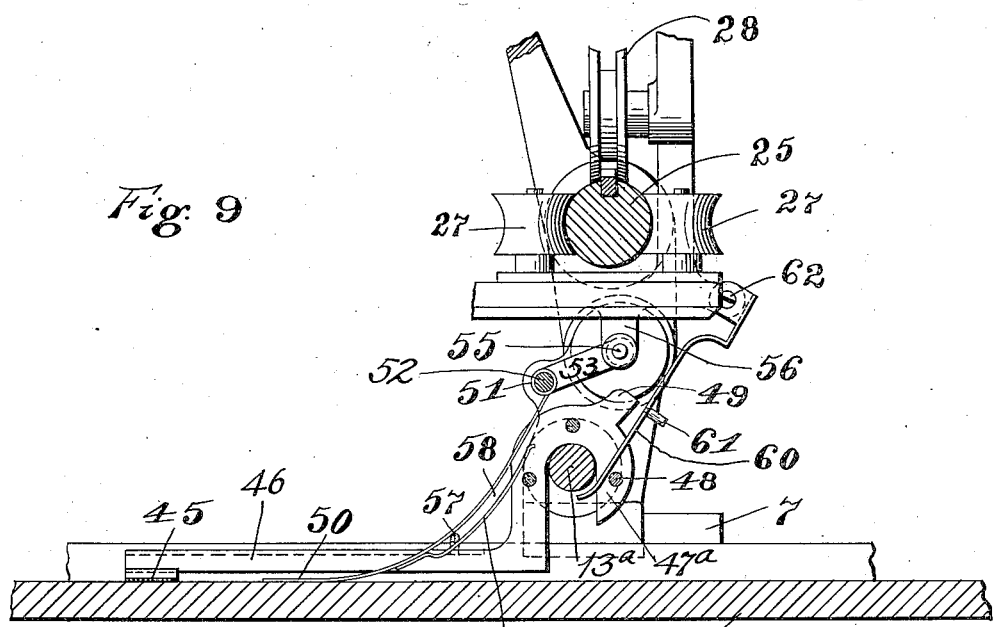

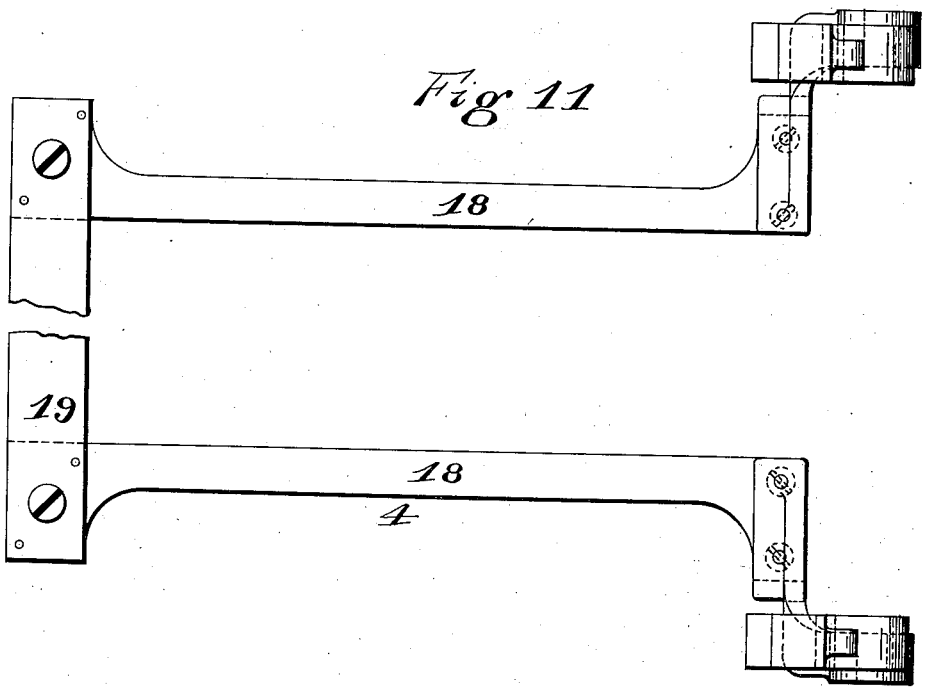
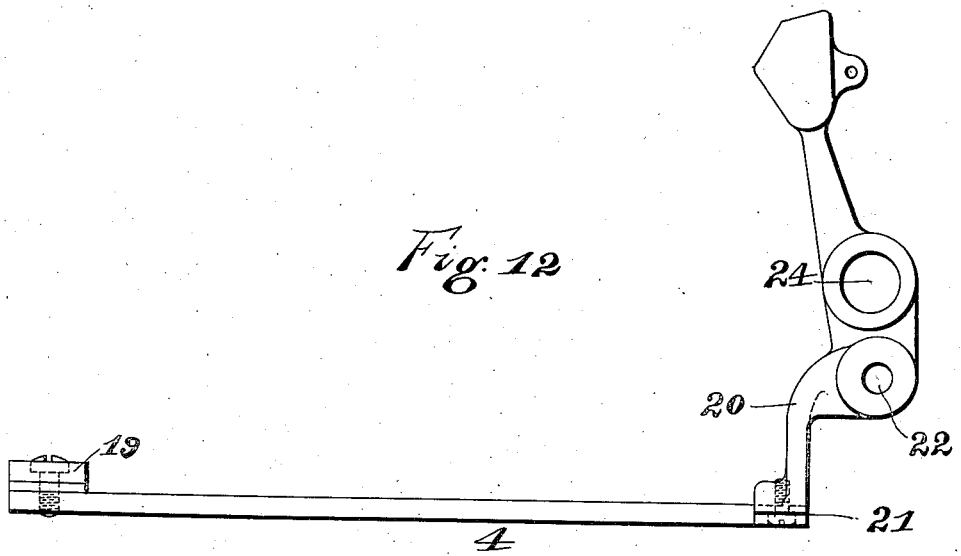

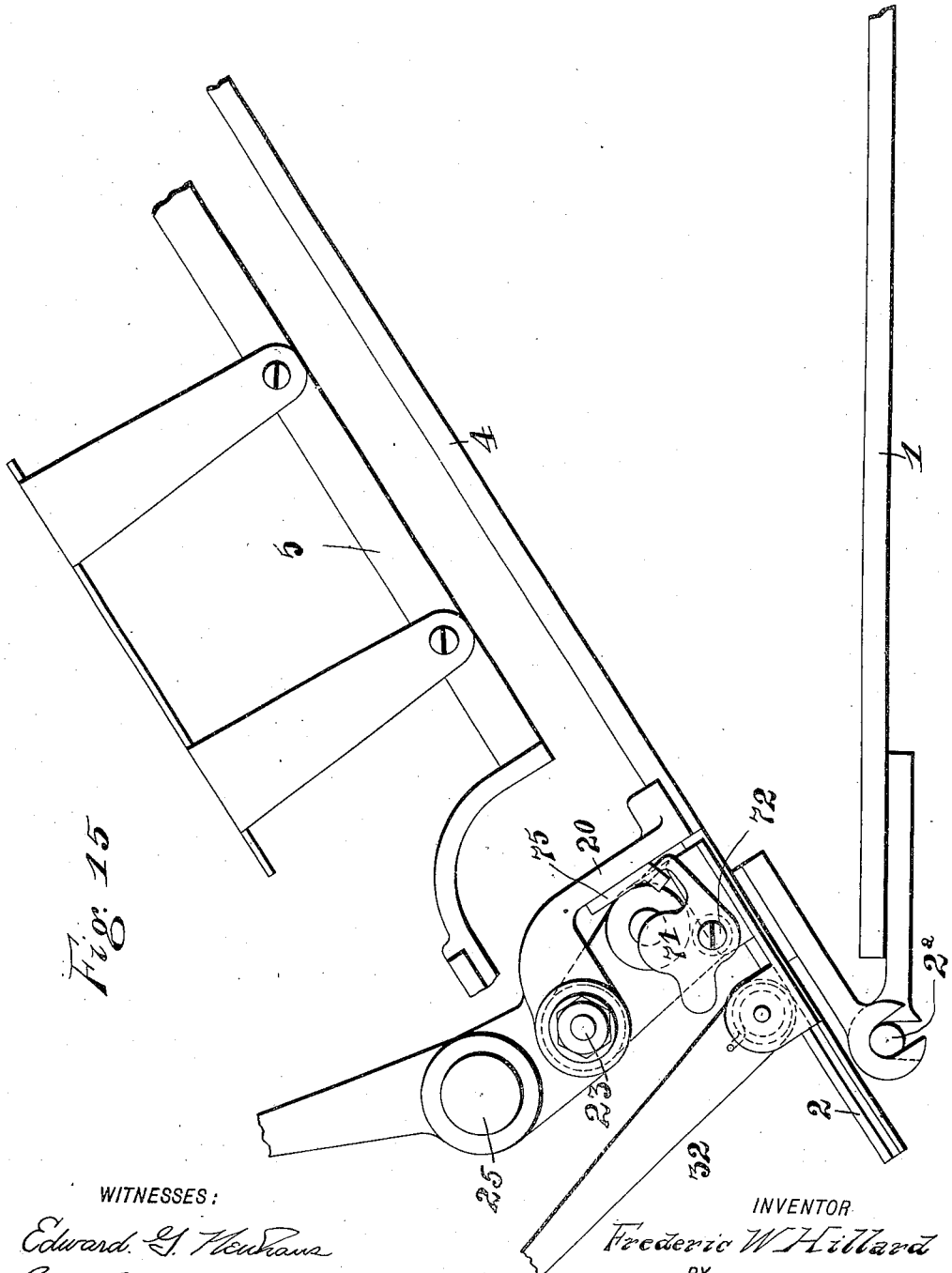

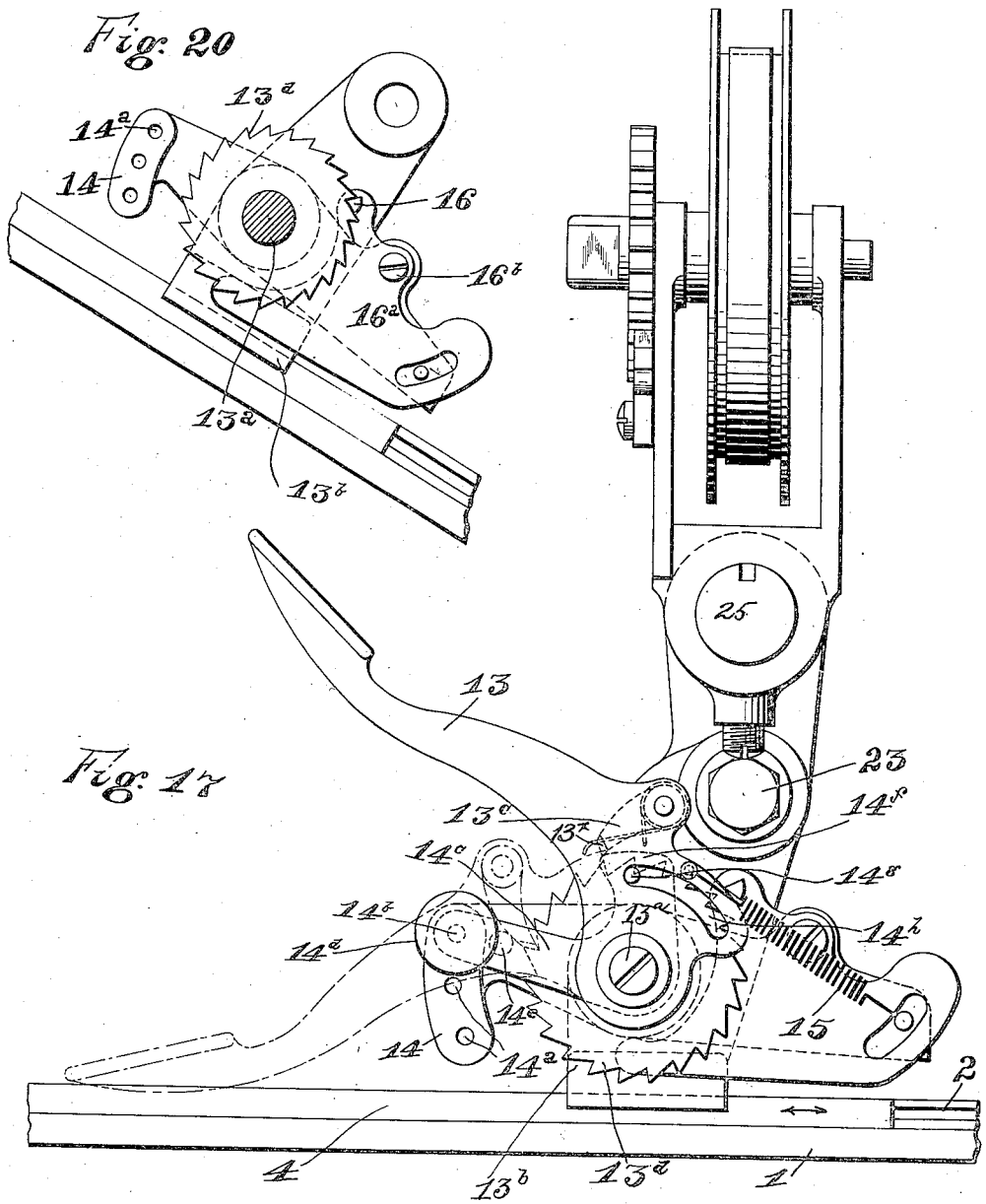

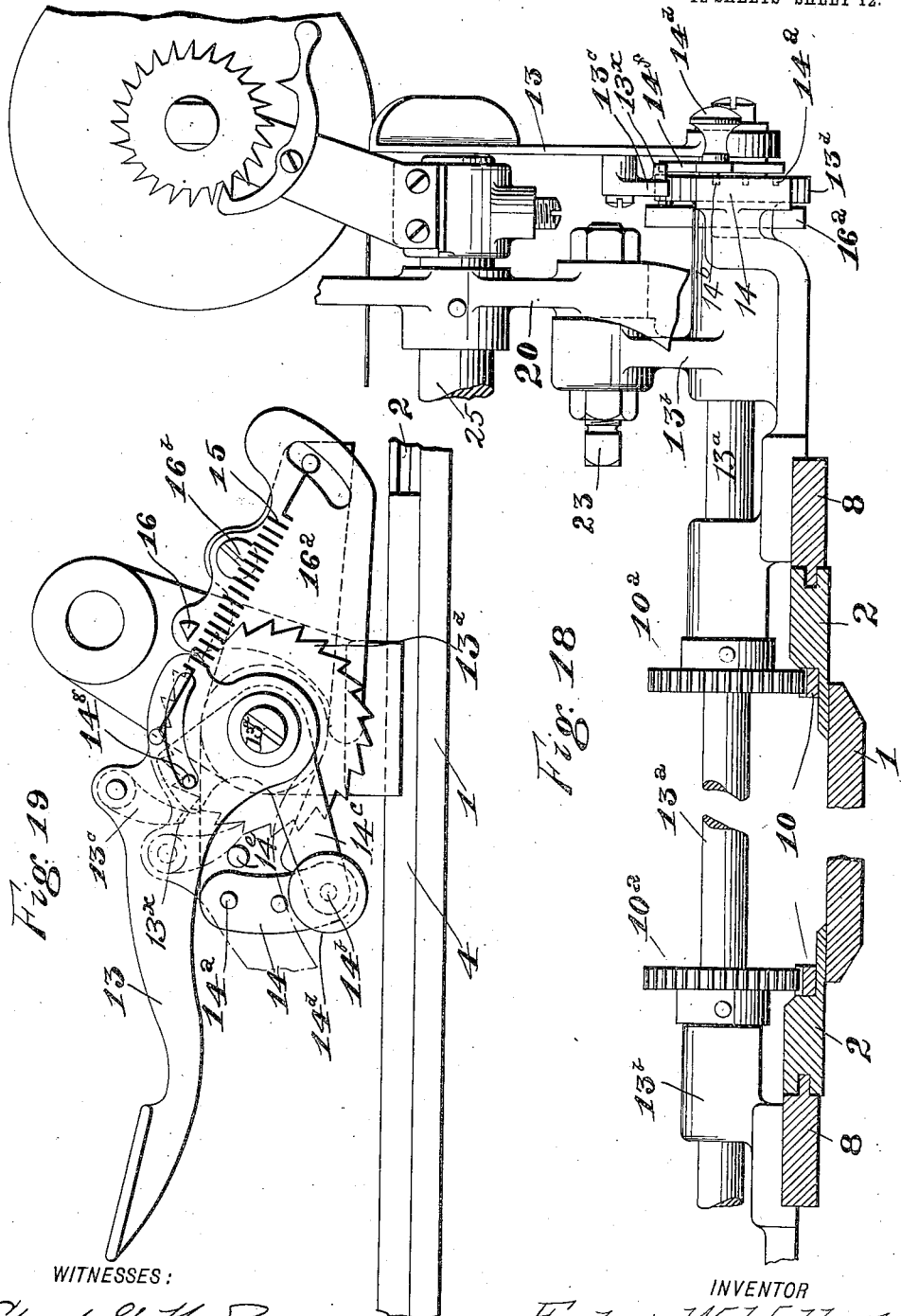

UNITED STATES PATENT OFFICE.

FREDERIC W. HILLARD, OF TOTTENVILLE, NEW YORK, ASSIGNOR, BY MESNE ASSIGNMENTS, TO ELLIOTT-FISHER COMPANY, OF NEW YORK, N. Y., A CORPORATION OF DELAWARE.

TYPE-WRITING MACHINE.

No. 863,065.   Specification of Letters Patent.   Patented Aug. 13, 1907.

Application filed December 23, 1901. Serial No. 86,999.

*To all whom it may concern:*

Be it known that I, FREDERIC W. HILLARD, a citizen of the United States of America, and a resident of Tottenville, in the county of Richmond, city and State of New York, have invented certain new and useful Improvements in Type-Writing Machines, of which the following is a specification.

This invention relates to typewriting machines and more particularly to book typewriters adapted to write upon the page of any ordinary bound book when spread out flat, or to write upon sheets of paper, envelops, cards, and the like.

One of the great defects in machines of this class heretofore in use is the liability to shock or jar the carriage and other parts, due to the carelessness of the operator, when turning the writing mechanism upward and downward and resulting in more or less injury to the machine.

In this connection an object of the invention is to so balance the carriage that it may be raised from or lowered to the writing position with perfect ease and without shock or jar to the various parts of the machine.

A further object is to provide mechanism by means of which work is facilitated by, for instance, making it easier to inspect the writing and to correct the same, by leaving the entire writing face of a sheet accesssible and fully exposed.

A still further object is to improve the construction of the line-spacing mechanism, whereby the carriage is shifted over one or a plurality of lines at will; in the present instance three.

A still further object of the invention is to provide means for automatically locking the carriage and the carriage-frame against running back upon the base-frame when the same is lifted, thereby preventing injury to the machine, due to the sudden impact of the carriage and the carriage-frame with any other parts of the machine.

A still further object is to automatically lock the carriage against being accidentally thrown back away from the base-frame, upon the lifting of the latter.

A still further object of the invention is to so mount the carriage and the carriage-frame upon the base-frame as that the base-frame does not have to be swung beyond a line perpendicular with the support for the machine, this being done in such a manner as that there will be practically no strain on the pivot or pivots upon the base-frame and parts supported thereby.

Further objects of the invention are to provide a machine which is effective, reliable, durable and substantial, in the class of work which it is called upon to execute.

The typewriter forming the subject of the present invention has a number of distinguishing points over and above those heretofore in use, among which there may be enumerated: that the carriage is adapted to occupy, without moving back of the vertical plane of its pivotal point of support, three definite positions above the printing point, in other words, two above writing position, as will appear hereinafter; that the guide-rail for the forward portion of the carriage is raised therewith; that the rear guide-rail moves with a swinging motion: that the carriage and carriage-frame are provided with means for automatically locking the same in their full pushed-back position on the base-frame, or, should the carriage and the carriage-frame not be pushed fully back, for automatically locking the carriage and carriage-frame against running back upon the base-frame during the lifting thereof; that the scale for letter, figure, character or word spacing is hung so that at the raising of the carriage to its second or highest position, the scale is caused to automatically clear or raise itself from the writing surface on which it rests; and that the pointer is hung so as to automatically rise with the scale, the consequence being that both scale and pointer are raised from the writing surface to their full elevation while the carriage is being moved from its first or lower raised position to the second or highest position.

My invention consists of certain features of construction and combinations of parts to be hereinafter fully described in detail and then pointed out in the claims.

In order that my invention may be more fully understood, I will now proceed to describe the same with reference to the accompanying twelve sheets of drawings, in which Figure 1 is a plan view of a book typewriter embodying my improvements, the supports for the machine and means for mounting the base-frame and platen upon the supports being omitted, to obtain sufficient size of view, the writing or printing mechanism being partially indicated by dotted lines, portions of the outer ends of the base-frame and platen being broken away, and the inner ends of the swing-frame forming a portion of the carriage-frame being broken away, but indicated in dotted lines for clearness' sake. Fig. 2 is a side elevation, showing the manner of mounting the platen and base-frame with its supported parts upon the supports, which are arranged upon a suitable table. In this figure, means for automatically locking the carriage and swing portion of the carriage-frame against keeling over away from the base-frame, when the latter is lifted, are shown. Fig. 3 is a broken detail view looking downward and, showing the means for automatically locking the carriage and swing-frame to the base-frame. Fig. 4 is an enlarged detail view of a ball-bearing joint which may be employed between the two frame-sections of which the carriage-frame is composed. Fig. 4ª is a detail of a friction device. Fig. 4ᵇ is a detail section of an adjustable line index-plate. Fig. 5 is a sectional side elevation of the machine, parts being broken away to show the scale and pointer. Fig. 6 is a side elevation of most of the parts shown in Fig. 5, showing the first raised position of the carriage in which the scale and pointer still rest upon the sheet. Fig. 7 is a side elevation of the same parts, in which the carriage is raised to its highest position and the scale and pointer lifted away from the sheet. Fig. 8 is a rear elevation of the machine, the writing mechanism attached to the carriage being omitted and a few parts broken away. Fig. 9 is an enlarged detail view of the means for automatically raising the scale and pointer, these being shown in normal using position. Fig. 10 is a view of the same parts enlarged, shown in the same position as in Fig. 7. Fig. 11 is a plan view, part being broken away, and Fig. 12 is a side view, both showing the swing-frame forming a part of the carriage-frame and upon the guide-rail of which the forward portion of the carriage travels. Figs. 13 and 14 are views corresponding in position, respectively, with the positions in Figs. 5 and 6, and showing so much of the base-frame, carriage-frame and carriage as suffices to illustrate the automatic lock for the carriage and carriage-frame at the opposite sides of the machine to that shown in Figs. 2 and 3, and Fig. 15 is a view, showing the said lock in action, when the base-frame is raised. Fig. 16 is a detail view of the said automatic lock, showing it in locked position corresponding with Fig. 15. Fig. 17 is a side view of parts of the machine, showing the line-spacing mechanism, the same being adjusted to feed for three line spaces. Fig. 18 is a view of the line-spacing mechanism as is seen from the left of Fig. 17, the base-frame and carriage-frame being shown in section, and the middle portion of the line-spacing shaft and the corresponding portion of the platen being broken out for the purpose of a sufficiently large illustration. Fig. 19 is a side elevation of the line-spacing mechanism, showing the same adjusted for spacing for one line space, and Fig. 20 is a detail view, parts being omitted, showing the means for locking the line-spacing mechanism when the base-frame is lifted.

Referring to the drawings, the platen 1 and the base-frame 2 (see Fig. 2 in particular) are each provided with lugs at their rear ends through which passes a pivot shaft 2ª that is carried by supports 2ᵇ mounted on a suitable table. By so pivotally mounting the base-frame and platen, they may be swung up independently clear of the table or they may be swung down so that the platen and the base-frame may be caused to lie on opposite sides of the surface to be written on, the platen being underneath. The carriage-frame is composed, as shown in Figs. 1 to 8, 11 and 12, of two principal members, 3 and 4, each composed of several connected parts and designated hereinafter a "slide-frame" and a "swing-frame", respectively. The slide-frame 3 which supports the carriage 5, (portions of which are shown in full lines and other portions by dotted lines) comprises a back-bar 7 extending transversely over the base-frame 2 and side-pieces 8 of the slide frame 3, at opposite ends of the back-bar, guided by a tongue-and-groove connection which is indicated in dotted lines in Fig. 1 and shown in full lines in Fig. 8, upon the outer edges of the base-frame 2.

On the forward ends of the side-pieces 8 plates 9 are screwed or suitably fastened as shown in Fig. 1 so as to extend inwardly across the upper surface of the sides of the base-frame, their inner ends being turned down and guided along the inner sides of the longitudinal racks 10, fixed to the side-pieces 11 of the base-frame, the purpose being to hold the forward ends of the said side-pieces 8 in position against spreading. One side-piece 8 is provided as shown in Fig. 1 preferably with a separate piece to be hereinafter described, on which is a mark, cut or other means, forming an index 12ª at one side of the carriage-frame, which index, as the carriage-frame is shifted during line-spacing, is caused to register with the graduations of scales 12, which may consist of graduated strips secured to the side portions of the base-frame and extending longitudinally thereof, or the graduations may, if desired, be made directly in the base-frame. In this way, means are provided for accurately indicating the line position of the writing mechanism, which position may be obtained by means of line-spacing mechanism now to be described.

The line-spacing mechanism shown in Figs. 17 to 20 particularly and conveniently described at this point, is composed of a spacing-lever 13 which is fulcrumed on a transverse rotary shaft 13ª that journals in bearings of brackets 13ᵇ, extending rigidly from opposite sides of the slide-frame of the carriage-frame 3—4, and is provided with a pawl 13ᶜ which is provided with a side toe 13ˣ and takes against the teeth of a ratchet-wheel 13ᵈ keyed on the shaft 13ª, so that the shaft may be intermittently turned for line-spacing and the spacing effectuated by the meshing of pinions 10ª fixed on the shaft 13ª with the teeth of the racks 10. The teeth of the ratchet-wheel the gear of the pinions 10ª and the racks 10 are so proportioned relatively to each other and to the ratchet-teeth that the rotation of the ratchet-wheel for the distance of each tooth will shift the carriage and carriage-frame along the base-frame from one line space to the next line space, the distance corresponding with the distance between contiguous graduations on the side scales 12. The bracket 13ᵇ adjacent the spacing-lever 13 is provided with a forwardly-projecting rigid arm 14 which is provided with a series (preferably three) of holes 14ª arranged concentrically to the axis of the shaft 13ª, said holes being adapted to receive a locking-pin 14ᵇ fixed to the outer end of the rocking-piece 14ᶜ which latter forms a line-space gage. This line-space gage 14ᶜ is pivoted on the shaft 13ª. By taking hold of a knob or button 14ᵈ on the line-space gage 14ᶜ and springing the latter outward the locking-pin 14ᵇ may be withdrawn from or engaged in any one of the concentric series of holes 14ª. Three holes 14ª are shown and these correspond with the three movements which in the present invention can be imparted to the spacing-lever 13. For limiting the extent of the downward movement of the spacing-lever 13 and causing it to stop at the same point, whatever its throw, a stop 14ᵉ is located at one side of the forwardly-extending arm 14 against which the end of the pawl 13ᶜ strikes so that the extremity of the toe 13ˣ is forced forwardly into the notch between the teeth then lying opposite and into which notch the toe of the pawl enters during the depression of the spacing-lever. This locks the ratchet wheel 13$^d$ and rack mechanism against excessive motion at this time, and prevents the parts from being carried by momentum beyond the proper positions.

Preferably, the end of the pawl 13$^c$ is cut square so as to fit squarely against the square shoulder of the tooth against which it abuts while the point of the pawl is received in the deepest portion of the notch. The pawl is spring-pressed so that it will automatically enter into engagement with the teeth of the ratchet while the spring is light enough to permit the pawl to ride backwardly over the teeth of the ratchet until the spacing-lever is brought into a position for engagement of the pawl with the ratchet-wheel. The spacing-lever as above intimated, has three possible normal positions which may be determined by the intervention of a device controlled by the line-spacing gage or rocking-piece 14$^e$. This device consists of an upward extension 14$^f$ on the rocking-piece 14$^e$, provided at one side with a stud or stop pin 14$^g$ which enters an arcuate slot 14$^h$ formed in the hub portion of the spacing-lever and concentric with the axis of the shaft 13$^a$.

It is not necessary that the spacing-lever be slotted, as one edge thereof may simply strike the stop-pin 14$^g$; the pin-and-slot connection is simply more workmanlike. The stop pin 14$^g$ may be set in three positions so that, under the actuation of a spring 15, the spacing-lever will be swung upwardly until the closed end of the slot 14$^h$ is brought to a stop against the pin 14$^g$, the upward movement of the spacing-lever being determined by the position of the pin 14$^g$.

While the line-space gage or rocking-piece 14$^e$ is arranged and constructed so that it may be set and fixed in any one of three positions, the spacing-lever 13 is moved relatively thereto in downward direction, under pressure imparted by the hand of the operator or in upward direction under the actuation of the spring 15. In normal position of the spacing-lever the toe of the pawl 13$^c$ rests upon the outer end of the upward extension 14$^f$ which serves as a cut-off, preventing the pawl in this position of the spacing lever from engaging with any of the teeth of the ratchet 13$^d$. In normal position, the extension 14$^f$ laps sufficiently over the tooth behind the one which is to be engaged by the pawl for moving the ratchet a definite distance as to prevent the engagement of the pawl therewith, the toe of the pawl, when the spacing-lever is depressed, moving through the space defined by the distance between two teeth and into engagement with the tooth lying in front of it, which is to be engaged, and the pawl then abutting against the stop 14$^e$ when the distance between the limits 14$^e$ and 14$^g$ has been traversed by the spacing-lever. What is here meant will be very clear when reference is made to Figs. 17 and 19.

In Fig. 17, the spacing mechanism is so set as that the carriage and carriage-frame may move over the distance of three line-spaces, that is to say, the pawl will move the ratchet-wheel the distance of three teeth until the pawl is wedged, as it were, by the stop 14$^e$ against the ratchet. In the adjustment here shown, the pin 14$^b$ is engaged in the upper hole 14$^a$ of the concentric series and the pin 14$^g$ is correspondingly set, so that under the actuation of the spring 15 the spacing-lever will be swung up to its highest point, a portion of the lever of the closed end of the slot 14$^h$ abutting against the pin 14$^g$. Said slot 14$^h$ is of a length sufficient to permit the greatest movement desired by the spacing-lever. When, in this position, the spacing-lever is depressed, the pawl 13$^c$ will engage the first tooth in front of the extension 14$^f$ and upon reaching the limit of its downward movement, the ratchet-wheel will have been moved the distance of three teeth, thus shifting the carriage and carriage-frame the corresponding distance by the intermeshing of the pinions 10$^a$ with the racks 10. Upon releasing the spacing-lever 13 the spring 15 pulls the same up until it is brought to rest against the pin 14$^g$, during which movement the toe of the pawl will ride freely over the teeth of the ratchet and will be automatically elevated onto the extension 14$^f$ and out of engagement with the ratchet wheel, the parts being then in position for another depression of the spacing-lever.

In Fig. 19 it will be observed that the locking-pin 14$^b$ is engaged with the lowermost hole 14$^a$ of the series and the spring 15 will therefore be correspondingly distended by the pressure of the pin 14$^g$ against the spacing-lever. When so set the spacing-lever and pawl can only be depressed for a distance corresponding with one line-space, the pawl engaging the tooth next in front of the extension 14$^f$ and turning the ratchet-wheel through the distance of one tooth until the pawl strikes the stop 14$^e$. By setting the locking-pin 14$^b$ in the intermediate hole the spacing mechanism is set for spacing for the distance of two line-spaces, in an evident manner.

It will be observed that the distance through which the spacing-lever can be moved is approximately represented by the distance between the limits formed by the stops 14$^e$ and 14$^a$, one of the same being adjustable to or from the other, and such adjustable limit or stop corresponding with the dead position of the pawl, that is to say, with its inoperative position.

In Fig. 17 the dotted lines indicate the spacing lever 13 in the lowest position to which it can be carried. It will be understood, however, that it can only be depressed to this position after the pin 14$^b$ is placed in the lowermost hole 14$^a$.

In order to maintain the line-position set by the depression of the spacing-lever, in case the base-frame 2 is lifted, the spacing mechanism is provided with means for automatically locking the pinions and the racks in mesh. In the form shown, the locking of the parts is not effectuated directly by the pinions and racks, but is performed by means of a locking-tooth which engages with the ratchet-wheel 13$^d$. The locking-tooth 16 is beveled at opposite sides so as to take directly into the notches between the teeth of the ratchet-wheel and is carried by a gravity-piece or dog 16$^a$ which is pivoted at 16$^b$ on a portion of the bracket 13$^b$. The stock of the gravity-piece 16$^a$ is so distributed at opposite sides of the pivot as that when all the parts are in normal writing position, the tooth 16 is out of engagement with the teeth of the ratchet-wheel, as illustrated in Fig. 19. But, when the base-frame, together with the supported parts is raised into inclined position shown in Fig. 20, the gravity-piece 16$^d$ turns on its pivot and its locking-tooth 16 takes into the notches of the ratchet-wheel 13$^d$. Such a gravity device, or rather such an automatic locking means, for the spacing mechanism is very essential in machines of the class described, inasmuch as the operator is always sure that when the parts are returned to writing position, they will register with the proper line-space.

The spacing lever 13 instead of being depressed directly, may, of course, be operated upon by any suitable devices, at a more convenient point relative to the right-hand of the operator. The index 12$^a$ for the side scales 12 is preferably formed not directly on the side-piece 8, but on a plate 12$^b$ (see Fig. 1) which is counter-sunk in the side-piece, the recess 12$^c$ receiving it being longer than the index-plate 12$^b$, so that by means of countersunk set-screws 12$^d$ passing through longitudinal slots 12$^e$ in the said side-piece, (see Fig. 4$^b$) the index-plate may be adjusted parallel with the side scales and the index 12$^a$ set in register with one of the graduations.

In the event of the machine being taken apart, or the pinions otherwise removed from mesh with the racks, they may not be returned so that the same teeth of the pinions will again intermesh at the same points of the racks. Then, since the numbers of teeth in the pinions are different from the number of ratchet teeth, the carriage frame will not be brought to the same points by the operation of the spacing lever so that the index 12$^a$ if it were non-adjustable, would not properly coöperate with the adjacent side-scale. In other words, when the carriage frame is adjusted to be spaced to new positions, so that the machine will print on new lines across the platen, the operator adjusts the index so that at each shift of the carriage for line spacing, the index will register with the adjacent graduations, which would not be the case were the index left in its original position. Hence, the adjustability, before described, of the said index, for enabling its registration with the graduations of its adjacent side-scale. The relative shifting of the points of impact of the printing type is advantageous, in that clear and smooth surfaces which would otherwise be left between ruts or grooves formed by the cross lines of impact upon the platen may be used for receiving the impact of the type, with the result that the whole impact-compass of the platen may be used to receive the force of the type-blows, and the life of the platen be thereby lengthened.

As before stated, the carriage-frame consists of two parts, 3—4, one of which is what is termed a "slide-frame" and the other a "swing-frame". The slide-frame has been described. The carriage travels transversely of the base-frame and platen upon the swing-frame 4, which is shown more clearly in detail in Figs. 11 and 12, and comprises side-bars 19 connected at their front ends by a guide-rail 19, located in a plane higher than the side-bars, and which are provided at their rear ends with upwardly extending laterally off-set arms 20 which are screwed or otherwise fastened thereto at 21. Arms 20 have bearings 22 intermediate of their ends for fixed pivot-bolts 23 on the brackets 13$^b$, whereby the swing-frame is fulcrumed to the slide-frame 3 in such manner that the side-bars of the swing-frame may, when swung down, clear the slide-frame and lie upon opposite sides thereof, the upper surface of the side-bars of these two parts being flush and the front guide-rail lying across and supported by the slide-frame. Above and adjacent to the fulcral point of the swing-frame, the arms 20 are provided with holes 24 in which is suitably fixed a guide-rail or rod 25 parallel with the front guide-rail 19. The carriage travels, slides or glides on these rails 19—25, it being usually, but not necessarily, provided to that end with forward guide and supporting rollers 26 which run on the rail 19, and its rear end being provided at opposite sides of the guide-rail 25 with guide-rollers 27 which are in the approximate plane of the carriage, and between and above the same, at an angle of 90° thereto, with supporting rollers 28; these rollers 27—28 run on the rail 25. All the rolls are attached by pivots or journals to the carriage frame 5. Rollers 28 are grooved so as to clear the toothed rack 28$^a$ for use with a suitable escapement for letter spacing, not a part of the present invention. Any suitable form of escapement may be used with the present machine. Preferably, the carriage-frame is provided at front with a hook 29, a portion of which travels under the guide-rail 19, and, as it were, buckles or confines the carriage to the swing-frame, (forming a portion of the carriage-frame) but permits it to travel transversely thereof with a perfectly free and unimpeded motion. When the carriage is raised or lowered around the rod 23, as a center the hook 29 compels the swing-frame to raise and lower with it.

Heretofore, in book typewriting machines, the front guide-rail 19, and the rear guide-rail supporting the carriage, remained always in operative relation to the platen, overlying the paper thereon, and obstructing, to an extent, the view of the printed matter and preventing free access thereto for the purpose of correction. By reason of their fixed position, they also prevented the free introduction, removal and adjustment of the sheets.

A characteristic novelty in my machine resides in the arrangement of the front and rear guide-rails, so that they may be moved bodily upward away from the platen so as to give an unobstructed view of the paper, and free access thereto. In other words, the rails on which the carriage travels laterally for letter spacing, are mounted to swing bodily upward with the writing mechanism, around a horizontal axis and away from the platen or paper supporting surface, which is left wholly free from obstruction.

The guide-rails will be seen in the drawings to move in the arcs of two different circles, the arc of the circle described by the rear guide-rail or rod 25 being much less than that described by the front guide-rail, and the pivotal points of both being the same, but the invention is not necessarily restricted to this arrangement; as it is evident that the axes of the rear guide-rail and the pivots for the carriage-frame may be practically coincident. This special feature causes the carriage to assume a balanced position, when swung back, without strain on the parts. It is possible that variations may be resorted to in this connection in which the exact relationship is not carried out, and I do not restrict my invention to the exact arrangement shown.

It is to be noted that my machine as described above contains the following features heretofore unknown; first, the combination of a writing mechanism which advances step by step as the successive letters are printed, with a spring connection which tends to swing the mechanism bodily upward around a center away from the writing field, and this without the spring causing any increased friction or resistance to the advancing movements of the printing carriage; second, the arrangement of a track or rail extending across the printing field and sustaining the printing mechanism, in such manner that the rail rises with the printing mechanism, leaving the field wholly clear and unobstructed so that the paper may be applied and removed without interference; and third, a frame sliding lengthwise of the lines as the printing progresses, and carrying both the printing mechanism hinged or jointed thereto, and the spring connections tending to swing the mechanism upward.

The swing-frame of the carriage-frame and the carriage on being lifted away from the writing or printing point or being lowered to the writing or printing point, coöperate with the following instrumentalities: To the end portions of the respective arms 20, links 30 one of them containing a longitudinal slot 42, are pivoted at one end, their opposite ends being pivoted to a pair of levers 31—32 which are fulcrumed on pivot-shafts 33—34 respectively that are fixed in ears or lugs 35—35$^a$ 36—36$^a$; one pair of lugs, 35—35$^a$ at one side of the machine projecting from one bracket 13$^b$ and the other pair at the opposite side of the machine projecting from the other bracket 13$^b$ both brackets being rigidly secured to the sliding frame. Helical torsion springs 37—38 are respectively coiled around the pivot-shafts 33—34, one end of spring 37 being anchored to the stationary lug 35$^a$ while its other end is connected with the lever 31; and on the other hand, one end of the spring 38 at the other side of the machine being secured to the lug 36 while its other end is connected with the lever 32. The described springs are placed under tension, due to the weight of the swing-frame 4 and carriage 5 when the latter are lowered into writing position, and, when the same are raised, it is evident that the tension of the springs which tend to turn the swinging frame and the carriage of the writing mechanism upward is relaxed in proportion to the distance the carriage is moved away from writing or printing position.

One feature of the invention in the embodiment herein shown, as previously intimated, is that the carriage has three useful positions, namely, a writing position, a correcting position and a full exposing or clearing position, respectively shown in Figs. 5, 6 and 7, that is, there are two raised positions of the carriage, in the first raised position of which one of the springs is brought out of action, while in the highest raised position both springs are brought out of action, in so far as the carriage cannot be moved back any further upon its pivot. But, these three positions are all within an angle of 90°, which is rendered possible by the proper balancing of the parts. It will be evident, however, to those skilled in the art that when the invention is applied to book typewriters such as the Elliott and Hatch, the three positions need not be within an angle of 90°, as in this class of machines, the type-basket 5$^a$ which supports the writing instrumentalities, such as the type, is mounted on the carriage. As regards those machines in which the carriage does not carry the type-bars, the adjustment, to come within the scope of the present invention, is within an angle of 90°. As in moving towards the vertical, the carriage and swing-frame do not exert as much leverage as when in writing position, one of the springs, in this instance 38, is rendered non-active or ineffective by the time the carriage is moved to its first raised position, in the following manner: a stop 39 is formed on the lug 36$^a$, and a projection 40 on the lever 32 (preferably formed by the protruding end of the spring 38) is caused to strike a stop 39, during the raising of the carriage, by the swinging movement of said lever. It is evident that some other stopping means may be used, as the lever itself may strike a suitable stop directly. Until stopped in the first raised position, both springs are acting on the carriage tending to move it up and it is only necessary to start the carriage upwardly, when both springs will pull it gently to the said position with ease and without shock, and when it is in this position the springs hold the carriage there. It will be seen on referring to Fig. 7 that the outer end of the lever 32 bears a pin 41 which enters a longitudinal slot 42 in the adjacent link 30, thereby permitting the carriage to be raised from its first raised to its second raised position. An arrangement to this end is required, as the lever 32 is now stopped and cannot move down any further, whereas the other lever 31 has a further downward movement. When the carriage is in its first raised position, the gentlest pressure will enable the carriage to move with the assistance of spring 37 to second raised position, in which position a stop 43 on the lug 35 is struck by a projection 44 on the lever 31, which projection is preferably formed by the protruding end of the spring 37. The length of the slot 42 in link 30 is such that at the moment the further oscillation of lever 31 is prevented, the pin 41 abuts against the end wall of the said slot so that a positive stop for that side of the carriage is furnished, which, in connection with the positive stop at the other side, prevents any racking of or injury to the parts by undue strains or stresses.

While it is preferred to make provision for maintaining the carriage at two different elevations, for the reasons already explained, it is to be understood that this is not essential, as my invention includes, in combination with the carriage, lifting or balancing devices adapted to hold or assist in holding it in one elevated position only.

Preferably a ball-bearing, such as is shown in Fig. 4, is provided in each of the joints between the pivot-pins 23 and the arms 20 of the swing-frame so that the latter and the carriage will be more sensitive to the action of the balancing springs and the touch, or, in other words, the sensitiveness of the carriage and the swing-frame of the carriage-frame to the gentle lift by the hand of the operator is more marked. To this end, the pivot-pins 23 are each provided with a reduced stem 23$^a$ forming a shoulder 23$^b$ between the same and the main portion of the pin, and a socket 20$^a$ on each arm is fitted with a hard-metal bushing 20$^b$ provided with annular V-shaped raceway 20$^c$ in which the balls 20$^d$ run, said balls also running in another complementary V-shaped raceway 23$^c$ which is formed by beveling the shoulder 23$^b$ and also the adjacent end of the hard-metal thrust-piece 23$^d$, that is sleeved onto the stem 23$^a$ and is set adjustably into the bushing 20$^b$ by a washer 23$^e$ and nut 23$^f$, which nut is screwed onto the projecting screw-threaded end of the said stem. Anti-friction joints are therefore provided between the arms 20 and the supporting brackets 13$^b$.

A peculiar arrangement and operation for the scale for indicating the letter and word spacing and for the pointer which coöperates therewith is resorted to in the present invention, for which purpose advantage is taken of the peculiar operation of the swing-frame and carriage. Figs. 1—5—6—7—9—10 may be referred to in this connection. The scale 45 consists of a thin strip of metal or any other suitable material provided with proper graduations extending in a series longitudinally thereof, such strip being adapted to rest transversely of and upon the surface to be written on, parallel with any written line, or any line to be written. Vertically swinging arms 46 which are hung on the rotary shaft 13ª of the line-spacing mechanism support the scale at their outer ends. Said arms should be approximately parallel with the surface to be written upon and should be located at opposite sides of the space between the sides of the base-frame so as not to interfere with a clear view or with the superposed mechanism, and they are therefore provided at their ends with angularly-extending hooks 47—47ª which open downwardly or towards the plane of said arms so that they may be hung over and detached from the shaft 13ª, thereby affording the proper pivotal connection. One or more brace-rods 48 parallel with shaft 13ª connect the rear hooked ends of the arms so as to maintain the scale 45 in proper position by stiffening its support. A heel 49 projects from the hook 47 and, by striking a relatively fixed point, restricts the upward swing of arms 46. The pointer 50 is caused to move across the sheet as the carriage travels from one side to the other of its guides on the carriage-frame, the upper end of the pointer being provided with a bearing sleeve 51 which is adapted to turn on and move along a rod 52 fixed transversely of the machine in the brackets 13ᵇ. Said rod 52 affords a pivot for the pointer.

The movement of the pointer transversely across the surface to be written upon is caused by a link 53, through one end of which the rod 52 passes, which end of said link is received in a recess 54 in the sleeve 51, while the other end of the link is pivoted at 55 to a lug 56 on the carriage. The pivot 55 is conicident with the pivots 23 around which the carriage swings, for evident reasons. The swinging movement does not directly actuate the pointer in the present instance; as the said link-connection is simply for the purpose of enabling the carriage to swing, without acting on the pointer therethrough. Said pointer is arranged to respond to the forward and backward movement of the scale, brought about as presently described, and, to that end, the scale-carrying arms 46 are connected by a lift-rod 57 which enters an opening 58, extending lengthwise of the shank of the pointer and formed by a keeper 59 at the under side of said shank. The keeper 59 projects rearwardly from its point of attachment to the pointer and is detached from the pointer at its rear end so that when desired the pointer may be disconnected from the lift-rod 57. For raising the scale and pointer from the paper a pusher 60, provided with a projection 61, is pivoted to the carriage at 62/ just below the rear guide-rail. When the carriage is raised to its first position the pusher 60 has no effect, but, as it rests and moves easily on one of the stiffening or brace rods 48 which forms a guide, it will, when the carriage has been lifted to its second raised position strike the said brace-rod or guide, quickly oscillate the arms 46, and raise the scale 45 away from the sheet with accelerated speed from the position shown in Fig. 6 to that shown in Fig. 7, the pointer responding to the movement with accelerated speed or with a speed at least in proportion to that of the scale, due to the action of the lift-rod 57 upon said pointer. The object of imparting the accelerating or differential movement from the carriage to the scale is to impart to the latter a long vertical movement sufficient to lift it entirely out of the way while the carriage is rising the short distance, or through the small arc, from its first to its second position. The automatic raising of the scale and pointer when the carriage is being moved from its first raised position to its second raised position is thereby caused; and, it is clear that the swing-frame instead of the carriage may be used to actuate the scale and pointer.

When it is desired to write on any page of a book or upon a single sheet or envelop, the same is properly arranged over the platen and the base-frame, with the carriage lowered until in writing position, whereupon the impression of the type upon the exposed surface may be proceeded with, the letter and word-spacing being accomplished through the medium of any suitable or well-known mechanism, not shown and not belonging to the present invention, and the line-spacing being effectuated by the depression of the spacing-lever 13, the extent of the movement of which, for spacing over one, two, three or a plurality of lines, is defined by the limiting devices heretofore described. As the scale 45 and the pointer 50 rest upon the surface written upon, they reliably indicate the position of the carriage in letter or word-spacing, while the scales 12 at the side in connection with the indexes 11 indicate the line position of the carriage. If it is desired to correct a word or letter, the swing-frame may be raised with the carriage to the first raised position, with slight effort, at the end of which movement one of the controlling springs, in the present instance 38, cannot exert a further pull but sufficient strength is left in both springs to counterbalance any leverage tendency of the carriage to return with its swing-frame to writing position. In this first raised position, the scale and pointer still rest on the paper, and notwithstanding the fact that the carriage is raised, it may be shifted one way or the other on its guide-rails and set in the desired lateral position, indicated by the fully visible scale 45 and pointer 50. On lowering the carriage, both the springs cushion the same, as it were, and prevent any shock to or breakage of the parts, if the carriage should be released before it has assumed writing position. If it is desired to expose the whole page or sheet, the swing-frame and carriage are moved up to the second raised position, which movement automatically raises the scale and pointer from the page or sheet. If a special clamp be used, as may be done, a loose sheet or envelop may be readily removed or inserted without raising the base-frame, unless the sheet be of such width as to lap under the base-frame, but even in this case it is only necessary to raise the base-frame slightly. In either raised position of the carriage, the same is maintained and balanced at the desired point without preventing the operator from using his hands for some other purpose, as in correcting or removing a sheet or envelop and replacing it by another.

Other portions of the typewriting machine forming the subject of the present invention and which will now be described are shown in Figs. 2, 3, 14 and 15. The features shown in these figures are the means for automatically locking the carriage against being accidentally turned back away from the base-frame 2 when the latter is swung upward to an erect position, as shown in Fig. 3. One form of device for this purpose is shown in Figs. 2 and 3 from which it will be observed that pivoted to the slide-frame 3 at 63 is a dog 64, preferably of the peculiar shape shown, that is to say, the dog is provided with a lip 65, adapted to be turned over the upper side of the swing-frame, and a finger 66 arranged angularly relatively to each other, the pivot being approximately in the angle. Extending from the pivot 63 approximately in line with finger 66 of the dog is an elongated weight 67 for the purpose presently to be stated.

A spring 68 is attached at one end to the finger 66 of the dog 64 and at its other end is anchored in a suitable manner to the slide-frame 3 of the carriage-frame 3—4. The tendency of this spring is to counteract the tendency of the weight 67 and to prevent the lip 65 of the dog from protruding beyond the outer edge of the slide-frame 3. The spring exercises this function during the normal travel of the carriage-frame along the base-frame, but as soon as the base-frame 2 is turned upward around its horizontal axis 2ª with the carriage thereon, the gravity of the weight 67 draws the lip 65 over into locking engagement over the upper surface of the adjacent side bar of the swing-frame 4 and stretches the spring 68. This action takes place automatically upon the raising of the base-frame with the carriage and the swing-frame, and hence the carriage is locked firmly to the base-frame so as to be prevented from swinging away from the base-frame, which action might take place on the rapid lifting of the base-frame. In other words, the gravity of the weight, 67, throws the dog into engagement over the lift frame when the parts are turned toward an upright position, while, on the contrary, the spring 68 throws the dog out of engagement when the parts are turned downward. Thus provision is made for preventing injury to any part of the machine due to the carriage swinging away from the base-frame when the base-frame itself is lifted, as the operator has not then hold of the swing-frame, but of the base-frame. Of course, a careful operator, even if such provision did or did not exist, would usually take hold of both the base-frame and the swing-frame in raising the same, but to prevent injury due to carelessness, it is better to make the above provision.

In Figs. 1 and 3 a stud or projection 69 is shown upon the rear end of the base-frame, in the path of travel of the finger 66 on the dog 64. The object of this stud or projection 69 is to engage the finger 66 and, notwithstanding the weight 67, to cause a positive actuation of the dog and to engage its lip 65 with the swing-frame 4. Ordinarily, the operator will move the carriage back as far as possible before lifting the base-frame 2, because if this is not done, the base-frame, front rail, carriage and other parts will produce a greater leverage to be overcome by the operator in lifting the base-frame. When the carriage is pushed back as far as possible, the same and the swing-frame will be automatically locked by the dog 64 in the above described manner through the medium of the stud 69 and will therefore prevent the moving of the carriage away from the base-frame. The parts are so balanced as that when the carriage is moved to its rearward position and the base-frame is moved up into the position shown in Fig. 2 until its rear portion contacts with a stop 70 on one of the brackets 2ᵇ, the parts supported by the base-frame and which lie on opposite sides of a vertical plane passing through the pivots 2ª will approximately balance each other. This position of the base-frame and supported parts when raised to the fullest extent leaves the base-frame in convenient position for being lowered when desired and at the same time enables the operator to have free use of the hands for other purposes than that of holding the base-frame in the most convenient position. This arrangement also obviates swinging of the base-frame over beyond the vertical plane and the consequent strain on the pivots which would be thereby produced. When the carriage is lowered and it is desired to write on the first line of a sheet, it is only necessary to depress the spacing-lever once to release dog 64 from stop 69. This action will also establish normal conditions in the swing-frame and carriage and parts actuated therethrough.

At the opposite side of the machine is preferably arranged an automatic lock for also preventing the carriage and swing-frame from moving away from the base-frame when the latter is lifted, such automatic lock therefore supplementing the action of the automatic lock on the opposite side of the machine for evident reasons. This form of lock is shown in Figs. 13—14—15 and 16. It consists of a dog 71 pivoted at 72 to the proper one of the brackets 13ᵇ and preferably operated by gravity, and to that end the dog is provided with a locking horn or hook 73 and a weighted portion 74 which is usually arranged angularly relatively to the locking-horn 73. When the base-frame is lifted, the dog 71 automatically swings on its pivot, from the position shown in Fig. 13 to the position shown in Fig. 15, so that the horn or locking finger 73 engages in a relatively arranged keeper 75 on the swing-frame, thereby preventing the moving of the swing-frame away from the base-frame. The detail view, Fig. 16, also shows the dog in locking engagement with the keeper. This described form of automatic lock operates in any shifted position of the carriage and swing-frame along the base-frame. Figs. 13 and 14 respectively show the non-activity of this form of automatic lock during the ordinary position of the carriage and swing-frame and during the lifting of the swing-frame and carriage away from the base-frame, while Fig. 15 clearly shows the automatic locking action of the dog 71 when the base-frame itself is lifted.

Another adjunct of the present invention is a vernier 76 which is preferably formed by graduations made directly in say the left hand side-piece 8 of the carriage-frame. The graduations of the vernier usually run from (0) zero to 9. The graduations at 76 of the vernier are spaced apart differentially with reference to those on the side of the frame 8, so that only one line of the vernier will be in register at one time with a line on the frame. As usual in vernier scales, each of the graduations at 76 will be distant from the next one an amount equal to one-tenth of the distance between the successive graduations on the frame 8. Owing to this fact, it becomes possible for the operator to advance the sliding frame, step by step, equal distances, although these distances may not agree with the graduations on the frame. In other words, it permits the machine to be operated for spacing the successive lines of print any required distance apart, without specially adjusting the scale or indicator on the machine and without requiring it to occupy any particular or peculiar relation to the printing point. The vernier is useful when it is desired to set the machine to print upon a line already printed upon, on a sheet or leaf which has been removed from the machine and is returned for additional writing or alteration or to print in line with a certain point on the sheet. Such lines or points are unlikely to come at points to which the spacing mechanism will naturally space, and the error with respect to the nearest point to which the machine will space must be ascertained on the vernier, by sliding the carriage frame so as to bring the desired line or point directly behind the letter scale, and then reading the error. Then, after the printing point is brought over the line or point at which it is desired to write, as near as may be by the spacing lever, the error is corrected by a slight further shifting of the carriage frame so that the same graduation on the vernier and the nearest graduation on the adjacent side scale are in register, or which two adjacent graduations of the vernier are most nearly in register with two adjacent graduations of the side scale. It will be understood that the index 12ª will unlikely register with the adjacent graduations, in adjusting the machine, and if it does not, then the vernier forms a valuable adjunct for this work. After a sheet or a book has been removed from the machine, it may be desired to make some corrections in various lines. The operator, in such case, replaces the sheet or page of the book in printing position and corrects the first line requiring correction, after adjusting the machine in the manner stated, and noting the registration of vernier and adjacent side scale. The carriage is now spaced until the next line to be corrected is in proper printing position, which is quickly ascertained by noting that the previously registered vernier graduation is in register with one of the side scale graduations.

In Figs. 1 and 4ª there is shown a friction device which may be used where the plane of the base-frame is different at different times. When the incline of the base-frame is greater there is a greater tendency of the carriage-frame to run down the incline. To overcome this, I prefer to use the said friction-device, consisting of a spring-arm 77 secured at one end to the back-bar 7 of the carriage-frame, by a screw 78, its free end extending under the back-bar and carrying a small pressure-roller 79 which travels on the base-frame 2. A regulating screw 80 adjustable in the back-bar 7 bears upon the spring-arm and may be adjusted to regulate the pressure of the roller 79 on the base-frame. The friction of the pressure-roller should be increased whenever the inclination of the base-frame is such as that the carriage-frame will travel forward too freely.

This invention is not restricted to the exact operation, arrangement and construction shown, as it is within the province of skilled mechanics to alter some parts and to substitute some parts by others, or to altogether omit some, without taking the remaining features or any of the features from the spirit and scope of the invention.

It is to be observed that the slide-frame of my machine consists of the two side-bars and a cross-connection at the rear only, so that the frame presents in plan view a U-form open at the front and without any obstruction across the printing field.

It is to be further observed that the lift-frame which carries the printing mechanism, is hinged at the rear to the slide-frame and that the cross-rod or shaft which carries the line-spacing gear is also at the rear of the slide-frame, so that when the lift-frame with the printing mechanism thereon is turned upward, the whole printing field is left unobstructed so that the paper may be freely inserted and removed, and so that the surface is accessible when making erasures, &c.

Having thus described my invention, what I claim as new and desire to secure by Letters Patent of the United States, is:

1. In a typewriting machine, the combination, with the carriage and a type-basket thereon, of means for maintaining the carriage and type-basket in two positions above writing position, substantially as described.

2. In a typewriting machine, the combination, with the base-frame, of the carriage and a type-basket pivotally mounted on the base-frame, and means for maintaining the carriage and type-basket in a plurality of positions above the writing position, substantially as described.

3. In a typewriting machine, the combination, with the carriage, and a type-basket thereon, of means for maintaining the carriage and type-basket in three definite positions, substantially as described.

4. In a typewriting machine, the combination, with the carriage, of means for maintaining the carriage in two positions above the writing position, all positions being within an angle of 90°, substantially as described.

5. In a typewriting machine, the combination, with the base-frame, of the pivotally mounted carriage, and means for holding the carriage in two positions above the writing position, all positions being within an angle of 90°, substantially as described.

6. In a typewriting machine, the combination, with the base-frame, of the carriage-frame shiftable on the base-frame, the carriage, and means for maintaining the carriage and a portion of the carriage-frame in two positions above the writing position, substantially as described.

7. In a typewriting machine, the combination, with the carriage, of means whereby the carriage is adapted to occupy and be supported, within an angle of 90°, in three definite positions above the printing point, substantially as described.

8. In a typewriting machine, the combination, with the base-frame and platen, of the carriage, and means for maintaining the carriage in a plurality of definite positions above the platen and the writing position, substantially as described.

9. In a typewriting machine the combination of a base frame, a slide frame movable thereon for line spacing, a swing frame jointed directly to the slide frame to turn bodily upward from its normal position over the printing field, a carriage containing the writing mechanism sustained wholly on the swing frame and arranged to advance step by step thereon as the successive letters are printed, and spring connections between the slide frame and swing frame tending to turn the latter upward.

10. In a typewriting machine and in combination a flat platen or paper support, a base frame sustained normally upon the platen and hinged to swing upward, a slide frame mounted on the base frame and movable for line spacing, a swing frame sustained wholly by the slide frame and hinged to swing upward from its normal position over the printing field, and a carriage provided with printing mechanism, sustained wholly by the swing frame and movable laterally thereon for letter spacing.

11. The combination of the slide frame movable for line spacing, the swing frame hinged directly thereto to turn bodily upward in the arc of a circle, and the writing mechanism having its carriage sustained wholly by the swing frame and arranged to advance step by step thereon as the successive letters are printed.

12. In a typewriting machine, the combination, with the base-frame, of the carriage-frame, composed of a slide-frame guided on the base-frame and a swing-frame pivoted to the slide-frame, said swing-frame supporting the front and rear guide-rails, for the transverse travel of the carriage, substantially as described.

13. In a typewriting machine, the combination of a flat platen, a slide frame located wholly outside of the printing field and movable for line spacing, a swing frame jointed directly to the slide frame and provided with a track or rail 19 lying across the printing field, and the carriage, carrying the writing mechanism and mounted to travel for letter spacing on the swing frame and its track 19; whereby the printing mechanism is adapted to turn bodily upward together with the underlying track in order to leave the printing field wholly unobstructed, so that the paper may be applied and removed without interference.

14. In a typewriting machine, the combination of a base-frame, a slide-frame movable thereover for line-spacing, said slide-frame being open or without cross-connections at the front, a swing-frame hinged to the rear end of the slide-frame and adapted to swing upward from its operative position, and a carriage for the printing mechanism mounted upon the swing-frame and movable laterally for word- and letter-spacing; whereby the upturning of the swing-frame will leave the entire printing field thereunder exposed and free from obstruction by cross-connections.

15. In a typewriting machine a flat paper sustaining platen, in combination with a frame movable thereover for line spacing and hinged to turn upward and backward in the arc of a circle from the operative position to expose the printing field, a spring tending to turn said frame upward, and a carriage provided with writing mechanism and sustained wholly upon the swing frame to advance step by step thereon for letter spacing, whereby the spring is caused to exert a lifting influence on the carriage without retarding its operative motion, and the writing mechanism adapted to turn bodily clear of the writing field to leave the paper fully exposed.

16. In a typewriting machine, a carriage adapted to be held in two positions above writing position, in combination with tension means to lift the carriage above writing position, and means for reducing the tension on the carriage in one of its lifted positions, substantially as described.

17. In a typewriting machine, a carriage adapted to occupy two definite positions above the writing position, in combination with two tension devices, and means for removing the tension of one of said tension devices when the carriage has been moved to one of said definite positions, substantially as described.

18. In a typewriting machine, the combination, with the carriage adapted to occupy three definite positions above the printing point, of two tension springs tending to lift the carriage, and devices for consecutively calling said springs out of action, substantially as described.

19. In a typewriting machine, the combination, with the carriage-frame, and the carriage guided on a swinging portion of the carriage-frame, of links connected with said swinging portion, and springs acting on said links and tending to lift the carriage, substantially as described.

20. In a typewriting machine, the combination, with the carriage-frame, and the carriage guided on a swinging portion of the carriage-frame, of links connected with said swinging portion, springs acting on said links, and stops for limiting the motion of said links, and for thereby cutting down the tension action of the spring, substantially as described.

21. In a typewriting machine, the combination, with the carriage-frame, and the carriage guided on a swinging portion of the carriage-frame, of helical tension springs anchored at one end, links connected with the swinging portion of the carriage-frame, the opposite ends of said springs being connected to said links, and stops for limiting the motion of the links, substantially as described.

22. In a typewriting machine, the combination, with the carriage-frame, and the carriage guided on a swinging portion of the carriage-frame, of pivoted links connected with the said swinging portion, the members of the one pair of pivoted links having a pin-and-slot connection with each other, and springs acting on said links, substantially as described.

23. In a typewriting machine, the combination, with the carriage-frame, and the carriage guided on a swinging portion of the carriage-frame, of a link connected with said swinging portion, a spring acting on said link, and a stop, substantially as described.

24. In a typewriting machine, a carriage adapted to occupy two positions above the writing position, in combination with a letter scale, and means for maintaining the letter scale in position upon the written matter when the carriage is being moved to the first raised position, substantially as described.

25. In a typewriting machine, the combination, with the upwardly movable carriage, of a movable letter scale, adapted to remain in position upon the written matter during the first part of the upward movement, and means for automatically raising the scale from the written matter during the completion of the said movement, substantially as described.

26. In a typewriting machine, the combination, with the carriage adapted to occupy two positions above the writing position, of a movable scale adapted to remain in position upon the written matter during the movement of the carriage to its first raised position, and means for automatically moving the scale from its resting point, when the carriage is moved to its second raised position, substantially as described.

27. In a typewriting machine, the combination, with the carriage adapted to occupy two positions above the writing position, of a movable scale adapted to remain in position upon the written matter during the movement of the carriage to its first raised position, and means for automatically moving the scale with accelerated speed from its resting point, when the carriage is moved to its second raised position, substantially as described.

28. In a typewriting machine, the combination, with a movable scale, adapted to rest on the sheet or written matter, of a swing-frame acting through a suitable part to raise the scale and a carriage mounted on such frame and moving first before the scale, substantially as described.

29. In a typewriting machine, the combination, with a scale mounted on a swinging arm, and adapted to gravitate onto the sheet, of means for raising the arm after the carriage has commenced to move, substantially as described.

30. In a typewriting machine, the combination, with the carriage adapted to occupy two positions above the writing position, of a scale supported by swinging arms independent of the carriage, and means for automatically swinging said arms during the raising of the carriage, substantially as described.

31. In a typewriting machine, the carriage in combination with a letter scale mounted on a pivoted arm independent of the carriage, and means for raising the scale after the carriage has partially completed its upward movement.

32. In a typewriting machine, the combination, with the carriage, of a pivoted arm supporting the letter scale, and a pusher operated by the raising of the carriage to swing said arm and lift the scale, substantially as described.

33. In a typewriting machine, the combination, with the carriage, of a swinging arm carrying a letter scale and provided with an abutment, and a pusher provided with a projection adapted to engage said abutment during the lifting of the carriage, substantially as described.

34. In a typewriting machine, the combination, with the carriage, and a swinging arm provided with a letter scale, normally adapted to rest upon the surface to be written upon, said arm being provided with an abutment, of a pusher provided with a projection supported sufficiently distant from said abutment to permit of an upward swinging motion of the carriage without action on the letter scale, said projection on the pusher being adapted to engage the abutment and lift the scale, upon the full upward movement of the carriage, substantially as described.

35. In a typewriting machine, the combination, with the platen and upwardly movable carriage, the carriage being relatively movable to the platen, of a letter-scale resting in writing position on the platen and adapted to be moved away from the platen during a portion only of the upward movement of the carriage, substantially as described.

36. In a typewriting machine, the combination, with the upwardly movable carriage, of a letter scale adapted to be moved during a portion only of the upward movement of the carriage, and a pointer for said scale, substantially as described.

37. In a typewriting machine, the combination, with the upwardly movable carriage, of a letter scale adapted to be moved during a portion only of the upward movement of the carriage, and a pivoted pointer for said scale, substantially as described.

38. In a typewriting machine, the combination, with the upwardly movable carriage, of a movable letter scale having a period of rest during the upward movement of the carriage, and a movable pointer coöperating with, and raised by the said scale, substantially as described.

39. In a typewriting machine, the combination, with the upwardly movable carriage, of a movable letter scale having a period of rest during the upward movement of the carriage, and a pointer pivoted at a fixed point and being suitably connected with and operated by the scale during its upward movement, substantially as described.

40. In a typewriting machine, the combination, with the carriage, of a pivoted arm supporting a letter scale, means for lifting the arm and scale, a pointer, and means for lifting the said pointer from the said arm, during the lifting of the scale, substantially as described.

41. In a typewriting machine, the combination, with the carriage, of a pivoted arm supporting a letter scale, a pointer pivoted above the point of support on said arm, and a keeper on the pointer in which may engage and play a portion on the said arm, and means for acting on the said arm, scale and pointer during the upward movement of the carriage, substantially as described.

42. In a typewriting machine, the combination, with the base-frame provided with a rack, of the carriage-frame, a shaft mounted in the carriage-frame and provided with a pinion meshing with said rack, means for turning the said shaft, and means normally out of action when the base-frame is lowered, for locking the pinion against retrograde rotation, when the base-frame is raised, substantially as described.

43. In a typewriting machine, the combination, with the base-frame, of the carriage-frame, a rotary shaft mounted in one of said parts, a pinion on said shaft, a rack mounted on the other of said parts, means for turning the shaft to shift the carriage-frame upon the base-frame, and means normally out of action when the base-frame is lowered, for locking the pinion against retrograde rotation, when the base-frame is raised, substantially as described.

44. In a typewriting machine, the combination, with the base-frame, and the carriage-frame guided on the base-frame, of means mounted on one of said parts for shifting the carriage-frame for line-spacing, such means comprising a rotary shaft provided with a ratchet wheel, a pivoted spacing-lever provided with a pawl for engaging the teeth of the ratchet wheel, a bracket or extension piece, a pivoted line-space gage provided with means for supporting it in a plurality of positions with respect to said bracket or extension piece, said gage being constructed with a portion to withhold the pawl from engagement with the ratchet teeth, and a suitable pin-and-slot connection between the said line-space gage and the spacing lever, substantially as described.

45. In a typewriting machine, the herein-described line-spacing mechanism, comprising a rotary shaft acting on the part to be spaced, a ratchet wheel on the said shaft, a spacing lever pivoted on said shaft and provided with a pawl for engaging the ratchet wheel, a stop against which the pawl abuts for limiting the downward movement of the spacing lever, a line-space gage also pivoted on the shaft, means for setting the gage in a plurality of positions, and means for defining the upper position of the spacing lever by the adjustment of said gage, substantially as described.

46. In a typewriting machine, the herein-described line-spacing mechanism, comprising a rotary shaft mounted on the part to be spaced, a ratchet wheel on the said shaft, a spacing lever provided with a pawl for engaging the ratchet wheel, a line-space gage adapted to be set in a plurality of positions, and a pin or stop on the gage whereby in the normal position of the spacing lever the pawl is withheld from the ratchet wheel, substantially as described.

47. In a typewriting machine, the combination of a base frame, a carriage frame for the writing mechanism, arranged to slide lengthwise of the base frame, for line spacing, a line spacing mechanism to advance the carriage, and a gravity device automatically locking the line spacing mechanism, substantially as described, whereby displacement of the carriage is prevented.

48. In a typewriting machine, the combination, with the base-frame, and the carriage-frame, shiftable thereon for line-spacing, of the line-spacing mechanism, and means for automatically locking the line-spacing mechanism only during the upward movement of the base-frame, whereby the lifting of the base frame and writing mechanism is prevented from changing the relation of the latter to the printing surface, substantially as described.

49. In a typewriting machine, the combination, with the base-frame and the carriage-frame, shiftable thereon for line-spacing, of a gravity lock for the line-spacing mechanism active for preventing the running back of the carriage only during the lifting of the base-frame, substantially as described.

50. In a typewriting machine, the combination, with the upwardly movable base-frame, the carriage-frame mounted shiftably on the base-frame and provided with a swinging portion and the carriage guided on the swinging portion, for letter and word spacing, of a lock for holding the swinging portion of the carriage-frame to the base-frame during the upward movement of the base-frame, substantially as described.

51. In a typewriting machine, the combination with the base-frame hinged to swing upward, the slide-frame mounted to move forward and backward on the base-frame, the carriage-frame provided with a printing mechanism and hinged to the slide-frame to swing upward therefrom, and an automatic lock, substantially as shown, for securing the carriage-frame to the base-frame when the latter is turned upward; whereby the hinged frame is prevented from falling backward regardless of its position when the base-frame is raised.

52. In a typewriting machine, the combination, with the upwardly movable base-frame and the carriage-frame mounted shiftably on the base-frame and provided with a swinging portion for the carriage, of a gravity lock for holding the swinging portion of the carriage-frame to the base-frame during the upward movement of the base-frame, substantially as described.

53. In a typewriting machine, the combination of the base frame, a carriage frame arranged to slide forward and backward thereon, a carriage mounted on the base frame and arranged to swing upward therefrom, a lock to prevent said swinging movement, and means through which said lock is thrown into action by the sliding movement of the base frame.

54. In a typewriting machine, the combination, with the base-frame, a carriage-frame shiftably mounted on the base-frame, and provided with a swinging portion for the carriage, of a lock to prevent the swinging movement of said portion and the carriage independently of the base-frame, and means for applying said lock through the shifting of the carriage-frame, substantially as described.

55. In a typewriting machine, the combination of a base-frame, a carriage-frame shiftably mounted on the base-frame, a stop to limit the rearward movement of the carriage-frame on the base-frame, and a lock to prevent the swinging movement of the carriage independently of the base-frame, a part on said lock being brought into engagement with the stop by the rearward movement of the carriage-frame on the base-frame, whereby the lock is applied to prevent said swinging movement, substantially as described.

56. In a typewriting machine, the combination of a base-frame, a carriage-frame shiftably mounted on the base-frame, and provided with a swinging portion for the carriage, a stop, to limit the rearward movement of the carriage-frame on the base-frame, a lock to prevent the swinging movement of said portion and the carriage independently of the base-frame, and a contact-portion on said lock brought into engagement with the stop by the rearward movement of the carriage-frame whereby the lock is applied to prevent said swinging movement, substantially as described.

57. In a typewriting machine, the combination of a flat platen to sustain the paper, a vertically swinging carriage with a writing mechanism thereon, a vertically swinging scale registering with the line to be written on when the carriage is swung upward, and means for imparting a relatively increasing movement from the carriage to the scale.

58. In a typewriting machine the combination of a flat platen, a writing mechanism movable thereover for letter spacing, and an intermediate mechanism movable for line spacing and including a track immediately overlying the platen to sustain the writing mechanism, said writing mechanism and track both arranged to turn backward and upward from the platen, substantially as described; whereby the platen may be wholly uncovered without sliding the writing mechanism rearward.

59. In a typewriting machine, the combination of a flat platen, an upwardly swinging carriage located thereover, an upwardly swinging scale and a loose connection between the carriage and scale, said connection adapted to permit a preliminary rise of the carriage before the rising of the scale.

60. In a typewriting machine, the combination of a platen, a swinging carriage, a swinging scale, and a loose operative connection between the carriage and scale, the scale normally resting on the platen, substantially as described.

61. In a typewriting machine, the combination of a flat platen, an upwardly swinging carriage, an upwardly swinging scale located over the platen, and a connection between the scale and carriage; whereby a differential movement is imparted from the carriage to the scale.

62. In a typewriting machine, the combination of a swinging carriage, and swinging scale, each having two extreme positions of rest, and the carriage having, in addition, an intermediate position of rest, substantially as described.

63. In a typewriting machine, the combination of the flat platen or paper support, a fixed line space scale extending lengthwise thereof, a frame carrying the writing mechanism and movable on the platen for line spacing, and an index adjustably mounted on the movable frame to coöperate with the scale.

64. In a typewriting machine, the combination, with a line-space scale, of an adjustable plate mounted on the carriage-frame, and an index on the plate, substantially as described.

65. In a typewriting machine, the combination, with the base-frame, of the carriage-frame shiftable on the same for line spacing, and a friction-device between the base-frame and carriage-frame and operating during the line spacing of the carriage-frame, substantially as described.

66. In a typewriting machine, the combination, with the base-frame, of the carriage-frame shiftable on the same for line spacing, and an adjustable friction device on the carriage-frame, bearing upon the base-frame during the line spacing of the carriage-frame, substantially as described.

67. In a typewriting machine, the combination of the base-frame, the carriage-frame shiftable on the same for line spacing, and means for regulating the freedom of movement of the carriage-frame upon the base-frame during line spacing, substantially as described.

68. In a typewriting machine, the combination of the base-frame, the carriage-frame shiftable on the same for line spacing, and adjustable means, located on one of said parts and engaging the other of said parts for regulating the freedom of movement of the carriage-frame upon the base-frame during line spacing, substantially as described.

69. In a typewriter, the combination of a flat platen or paper support, a base frame to confine the paper, hinged to turn upward from the writing position, a slide frame mounted on the base frame and movable for line spacing, a swing frame hinged to and sustained by the slide frame and adapted to turn upward from the printing position, a carriage supporting the writing mechanism and mounted on the swing frame to travel laterally for letter spacing, and a spring interposed between the slide frame and the swing frame and tending to lift the latter with the carriage thereon.

70. In a typewriting machine, the combination of a flat platen or paper support, a slide-frame movable thereover for line-spacing, said frame being of U-form and wholly open at the front, a swing-frame hinged to the slide-frame to turn upward from the printing position, a carriage sustaining the writing mechanism and mounted on the swing-frame to move laterally for letter-spacing, and a spring interposed between the slide-frame and swing-frame and tending to lift the latter; whereby an easy upturning of the swing-frame and printing mechanism is permitted, and the printing field thereunder left wholly unobstructed when said frame is lifted.

71. In a typewriting machine, the combination of a flat platen or paper support, a frame movable thereover for line spacing, a carriage frame hinged to the sliding frame by a horizontal axis, to turn upward, a laterally movable carriage for the writing mechanism, supported and arranged to travel laterally on said hinged frame, and spring connections adapted to permit the carriage to remain in the writing position to assist in raising the same and to maintain it when elevated.

72. In a typewriting machine, a flat bed or platen, a frame movable thereover for line spacing, a carriage support hinged to the sliding frame to swing upward, a carriage provided with writing mechanism and mounted to travel laterally on the hinged frame for letter spacing, and a spring connection exerting a lifting influence on the hinged frame, whereby the writing mechanism is subjected to a lifting influence without offering resistance to its lateral motion.

73. In a typewriting machine, the combination of a flat platen or paper support, a writing mechanism hinged to swing upward from the printing position, a hinged scale overlying the paper support, and connections whereby the scale is lifted when the writing mechanism is turned to its uppermost position.

74. In a typewriting machine, a flat platen or paper support, a frame arranged to move thereover for line spacing a laterally movable writing mechanism and a supporting carriage therefor, hinged to the sliding frame to swing upward from the writing position, to leave the surface of the paper unobstructed and a transverse scale hinged and connected to the writing mechanism, to rise automatically from the paper when the writing mechanism is turned upward.

Signed at New York, this 19th day of December, 1901.

FREDERIC W. HILLARD.

Witnesses:
EDWARD J. MURPHY,
GEO. L. WHEELOCK.